US012646470B2

(12) United States Patent
Lim et al.

(10) Patent No.: US 12,646,470 B2
(45) Date of Patent: Jun. 2, 2026

(54) DISPLAY DEVICE AND METHOD OF DRIVING THE DISPLAY DEVICE, AND ELECTRONIC DEVICE

(71) Applicant: Samsung Display Co., LTD., Yongin-si (KR)

(72) Inventors: Jae Keun Lim, Yongin-si (KR); Bon Seog Gu, Yongin-si (KR); Jin Young Roh, Yongin-si (KR); Hae Kwan Seo, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/215,026

(22) Filed: May 21, 2025

(65) Prior Publication Data

US 2025/0391380 A1 Dec. 25, 2025

(30) Foreign Application Priority Data

Jun. 19, 2024 (KR) ........................ 10-2024-0079892
Aug. 8, 2024 (KR) ........................ 10-2024-0106114

(51) Int. Cl.
*G09G 3/32* (2016.01)
*G09G 3/3233* (2016.01)
(Continued)

(52) U.S. Cl.
CPC ......... *G09G 3/3275* (2013.01); *G09G 3/3233* (2013.01); *G09G 3/32* (2013.01);
(Continued)

(58) Field of Classification Search
CPC ...... G09G 3/3275; G09G 3/3233; G09G 3/32; G09G 3/3266; G09G 2300/0426;
(Continued)

(56) References Cited

U.S. PATENT DOCUMENTS 8,816,998 B2 * 8/2014 Pyon ........................ G09G 3/32
345/204
9,520,085 B2 * 12/2016 Ko ........................ G09G 3/3233
(Continued)

FOREIGN PATENT DOCUMENTS

KR 1020190069208 A 6/2019
KR 20200078995 A * 7/2020 ........... G09G 3/3233
(Continued)

*Primary Examiner* — Olga V Merkoulova
(74) *Attorney, Agent, or Firm* — CANTOR COLBURN LLP

(57) ABSTRACT

A display device includes pixels connected to scan lines, emission control lines, control lines, and data lines. The pixels include a first pixel and a second pixel positioned adjacent to each other in an i-th control line and connected to a j-th data line. The first pixel includes a first selection unit configured to transmit a data signal input from the j-th data line to a driving transistor of the first pixel during a first period in response to a control signal supplied to the i-th control line. The second pixel includes a second selection unit configured to transmit the data signal input from the j-th data line to a driving transistor of the second pixel during a second period different from the first period in response to the control signal supplied to the i-th control line.

23 Claims, 23 Drawing Sheets

(51) Int. Cl.
*G09G 3/3275* (2016.01)
*G09G 3/3266* (2016.01)

(52) U.S. Cl.
CPC ... *G09G 3/3266* (2013.01); *G09G 2300/0426* (2013.01); *G09G 2300/0804* (2013.01); *G09G 2300/0814* (2013.01); *G09G 2300/0819* (2013.01); *G09G 2300/0842* (2013.01); *G09G 2300/0861* (2013.01); *G09G 2310/08* (2013.01); *G09G 2320/0238* (2013.01)

(58) Field of Classification Search
CPC ... G09G 2300/0804; G09G 2300/0814; G09G 2300/0819; G09G 2300/0842; G09G 2300/0861; G09G 2310/08; G09G 2320/0238
See application file for complete search history.

(56) References Cited

U.S. PATENT DOCUMENTS

| | | | | |
|---|---|---|---|---|
| 10,540,927 | B2 | 1/2020 | Park et al. | |
| 11,094,258 | B2 | 8/2021 | Park et al. | |
| 2011/0221715 | A1* | 9/2011 | Yang | G09G 3/3648 345/204 |
| 2012/0313903 | A1* | 12/2012 | Pyon | G09G 3/32 345/82 |
| 2015/0015468 | A1* | 1/2015 | Ko | G09G 3/3233 345/82 |
| 2021/0049959 | A1* | 2/2021 | Park | G09G 3/3233 |

FOREIGN PATENT DOCUMENTS

| | | | |
|---|---|---|---|
| KR | 1020210021219 | A | 2/2021 |
| KR | 1020230131808 | A | 9/2023 |

* cited by examiner

120: 122, 124, 126

DISPLAY DEVICE AND METHOD OF DRIVING THE DISPLAY DEVICE, AND ELECTRONIC DEVICE

This application claims priority to Korean Patent Application No. 10-2024-0079892, filed on Jun. 19, 2024, and Korean Patent Application No. 10-2024-0106114, filed on Aug. 8, 2024, and all the benefits accruing therefrom under 35 U.S.C. § 119, the contents of which in their entirety are herein incorporated by reference.

BACKGROUND

(a) Field of the Invention

Embodiments supported by the present disclosure relates to a display device and a method of driving the display device, and electronic device.

(b) Description of the Related Art

As information technology advances, the role of display devices as a medium connecting users with information is becoming increasingly important. Accordingly, the usage of display devices such as, for example, liquid crystal display devices and organic light-emitting display devices is increasing.

The number of channels of a data driver in some display devices may be reduced by using a demultiplexer or the like. If a demultiplexer is included in the display device, dead space and the like may increase.

SUMMARY

One object of embodiments of the present disclosure is to provide a display device and a method of driving the same that may reduce the number of channels of a data driver without including a demultiplexer.

A display device according to embodiments of the present disclosure includes pixels connected to scan lines, emission control lines, control lines, and data lines, wherein the pixels include a first pixel and a second pixel positioned adjacent to each other in an i-th horizontal line and connected to a j-th data line wherein i is a natural number of 1 or more and j is a natural number of 1 or more, the first pixel includes a first selection unit, and the first selection unit is configured to transmit a data signal input from the j-th data line to a driving transistor of the first pixel during a first period in response to a control signal supplied to the i-th control line, and the second pixel includes a second selection unit, and the second selection unit is configured to transmit the data signal input from the j-th data line to a driving transistor of the second pixel during a second period different from the first period in response to the control signal supplied to the i-th control line.

According to an embodiment, the display device further includes a data driver configured to supply data signals to the data lines, wherein the data driver is configured to supply a first data signal corresponding to the first pixel to the j-th data line during the first period, and supply a second data signal corresponding to the second pixel to the j-th data line during the second period.

In an embodiment, the first selection unit is configured to electrically connect a gate electrode of the driving transistor of the first pixel with the j-th data line during the first period.

In an embodiment, the second selection unit is configured to electrically connect a gate electrode of the driving transistor of the second pixel with the j-th data line during the second period.

In an embodiment, the i-th control line is at least one of the scan lines and the emission control lines.

In an embodiment, each of the scan lines includes a first sub-scan line, a second sub-scan line, and a third sub-scan line, and each of the first pixel and the second pixel further includes: a first transistor corresponding to the driving transistor and including a first electrode connected to a first power line via a first node, a second electrode connected to a second node, and a gate electrode connected to a third node; a second transistor connected between the second node and the j-th data line and including a gate electrode connected to an i-th first sub-scan line; a third transistor connected between the first node and the third node and including a gate electrode connected to the i-th first sub-scan line; and a light-emitting element including an anode electrode connected to the second node and a cathode electrode connected to the second power line.

According to an embodiment, the first selection unit included in the first pixel includes a P-type first selection transistor connected between the third transistor included in the first pixel and the third node included in the first pixel, wherein the P-type first selection transistor includes a gate electrode connected to the i-th control line, and the second selection unit included in the second pixel includes an N-type second selection transistor connected between the third transistor included in the second pixel and the first node included in the second pixel, wherein the N-type second selection transistor includes a gate electrode connected to the i-th control line.

In an embodiment, the P-type first selection transistor is configured to turn on during the first period in response to the control signal, and the N-type second selection transistor is configured to turn on during the second period in response to the control signal.

In an embodiment, each of the first pixel and the second pixel further includes: a fourth transistor connected between the third node and a third power line and including a gate electrode connected to an i-th second sub-scan line; a fifth transistor connected between the anode electrode of the light-emitting element and a fourth power line and including gate electrode connected to an i-th third sub-scan line; a sixth transistor connected between the first power line and the first node and including a gate electrode connected to the i-th emission control line; a seventh transistor connected between the second node and the anode electrode of the light-emitting element and including a gate electrode connected to the i-th emission control line; and a storage capacitor connected between the third node and the anode electrode of the light-emitting element.

In an embodiment, the i-th control line is an emission control line located in a next horizontal line.

According to an embodiment, the i-th control line is an (i+2)-th emission control line.

According to an embodiment, the display device further includes: a gate driver configured to drive the scan lines; and an emission driver configured to drive the emission control lines, wherein the gate driver is configured to supply a second scan signal of a gate-on voltage to the i-th second sub-scan line, and then supply a first scan signal of a gate-on voltage to the i-th first sub-scan line and supply a third scan signal of a gate-on voltage to the i-th third sub-scan line such that the first scan signal and the third scan signal overlap each other; the emission driver is configured to supply an emission control signal of a logic high level to the i-th emission control line so as to overlap with the first scan signal, the second scan signal, and the third scan signal, and the emission driver is configured to supply an emission control signal of a logic high level to the (i+2)-th emission control line such that the emission control signal overlaps with the first scan signal for a partial period.

According to an embodiment, the first selection unit included in the first pixel includes a first selection transistor connected between the third transistor included in the first pixel and the third node included in the first pixel, wherein the first selection transistor includes a gate electrode connected to the first sub-control line among the i-th control lines, and the second selection unit included in the second pixel includes a second selection transistor connected between the third transistor included in the second pixel and the first node included in the second pixel, wherein the second selection transistor includes a gate electrode connected to the second sub-control line among the i-th control lines.

According to an embodiment, the control signal includes a first control signal supplied to the first sub-control line and a second control signal supplied to the second sub-control line, the first selection transistor is configured to turn on during the first period in response to the first control signal, and the second selection transistor is configured to turn on during the second period in response to the second control signal.

In an embodiment, each of the first pixel and the second pixel further includes: a fourth transistor connected between the third node and a third power line and including a gate electrode connected to the i-th second sub-scan line; a fifth transistor connected between the anode electrode of the light-emitting element and a fourth power line and including a gate electrode connected to an i-th third sub-scan line; a sixth transistor connected between the first power line and the first node and including a gate electrode connected to an i-th emission control line; a seventh transistor connected between the second node and the anode electrode of the light-emitting element and including a gate electrode connected to the i-th emission control line; and a storage capacitor connected between the third node and the anode electrode of the light-emitting element.

In an embodiment, the first sub-control line is an (i+1)-th second sub-scan line, and the second sub-control line is an (i+2)-th second sub-scan line.

In an embodiment, the display device further includes: a gate driver configured to drive the scan lines; and an emission driver configured to drive the emission control lines, wherein the gate driver is configured to sequentially supply a second scan signal of a gate-on voltage to the i-th second sub-scan line, the (i+1)-th second sub-scan line, and the (i+2)-th second sub-scan line such that the second scan signal at the i-th second sub-scan line, the second scan signal at the (i+1)-th second sub-scan line, and the second scan signal at the (i+2)-th second sub-scan line do not overlap each other, the gate driver is configured to supply a first scan signal of a gate-on voltage to the i-th first sub-scan line and a third scan signal of a gate-on voltage to the i-th third sub-scan line such that: the first scan signal at the i-th first sub-scan line overlaps with the second scan signal at the (i+1)-th second sub-scan line and the second scan signal at the (i+2)-th second sub-scan line for a partial period; and the third scan signal at i-th third sub-scan line overlaps with the second scan signal at the (i+1)-th second sub-scan line and the second scan signal at the (i+2)-th second sub-scan line for a partial period, the emission driver is configured to supply an emission control signal of a gate-off voltage to the i-th emission control line such that the emission control signal overlaps with the second scan signal at the i-th second sub-scan line, the second scan signal at the (i+1)-th second sub-scan line, and the second scan signal at the (i+2)-th second sub-scan line, a period during which the second scan signal at the (i+1)-th second sub-scan line and the first scan signal at the i-th first sub-scan line overlap is the first period, and a period during which the second scan signal at the (i+2)-th second sub-scan line and the first scan signal at the i-th first sub-scan line overlap is the second period.

According to an embodiment, the first sub-control line is the i-th third sub-scan line, and the second sub-control line is an (i+1)-th third sub-scan line.

According to an embodiment, the display device further includes: a gate driver configured to drive the scan lines; and an emission driver configured to drive the emission control lines, wherein the gate driver is configured to supply a second scan signal of a gate-on voltage to the i-th second sub-scan line, and then supply a first scan signal of a gate-on voltage to the i-th first sub-scan line, the gate driver is configured to supply a third scan signal of a gate-on voltage to the i-th third sub-scan line such that the third scan signal overlaps at least partially with the second scan signal and the first scan signal, the gate driver is configured to supply the third scan signal of the gate-on voltage to the (i+1)-th third sub-scan line such that the third scan signal overlaps at least partially with the first scan signal, and the emission driver is configured to supply an emission control signal of a gate-off voltage such that the emission control signal overlaps with the second scan signal at the i-th second sub-scan line and the third scan signal at the (i+1)-th third sub-scan line.

A method of driving a display device according to an embodiment supported by the present disclosure includes: electrically connecting a driving transistor of a first pixel and a data line during a first period in response to a first control signal supplied to a first selection unit included in the first pixel; and electrically connecting a driving transistor of a second pixel and the data line during a second period different from the first period in response to a second control signal supplied to a second selection unit included in the second pixel.

According to an embodiment, the method further includes: supplying a first data signal corresponding to the first pixel to the data line during the first period; and supplying a second data signal corresponding to the second pixel to the data line during the second period.

According to an embodiment, each of the first pixel and the second pixel is connected to a plurality of sub-scan lines and an emission control line, and each of the first control signal and the second control signal is one of scan signals supplied to the plurality of sub-scan lines or one of emission control signals supplied to the emission control line.

The tasks of embodiments of the present disclosure are not limited to the tasks mentioned above, and other technical tasks not mentioned may be clearly understood by those skilled in the art from the description below.

An electronic device according to an embodiment supported by the present disclosure includes: a display device including: pixels connected to scan lines, emission control lines, control lines, and data lines, wherein: the pixels include a first pixel and a second pixel positioned adjacent to each other in an i-th control line and connected to a j-th data line, wherein i is a natural number of 1 or more and j is a natural number of 1 or more, the first pixel includes a first selection unit, and the first selection unit is configured to transmit a data signal input from the j-th data line to a driving transistor of the first pixel during a first period in response to a control signal supplied to the i-th control line, and the second pixel includes a second selection unit, and the second selection unit is configured to transmit the data signal input from the j-th data line to a driving transistor of the second pixel during a second period different from the first period in response to the control signal supplied to the i-th control line.

According to the display device, the method of driving the display device, and the electronic device according to the embodiments supported by the present disclosure, a plurality of data signals supplied to one data line may be supplied to a plurality of pixels by time-division using a selection unit included in each pixel. That is, in the embodiments supported by the present disclosure, a data line may be shared without a demultiplexer, and dead space and the like may be reduced accordingly.

However, the effect of the example embodiments described herein is not limited to the above-described effect, and may be variously expanded within the scope that does not depart from the spirit and scope of the embodiments described herein.

DETAILED DESCRIPTION

Figure 1:
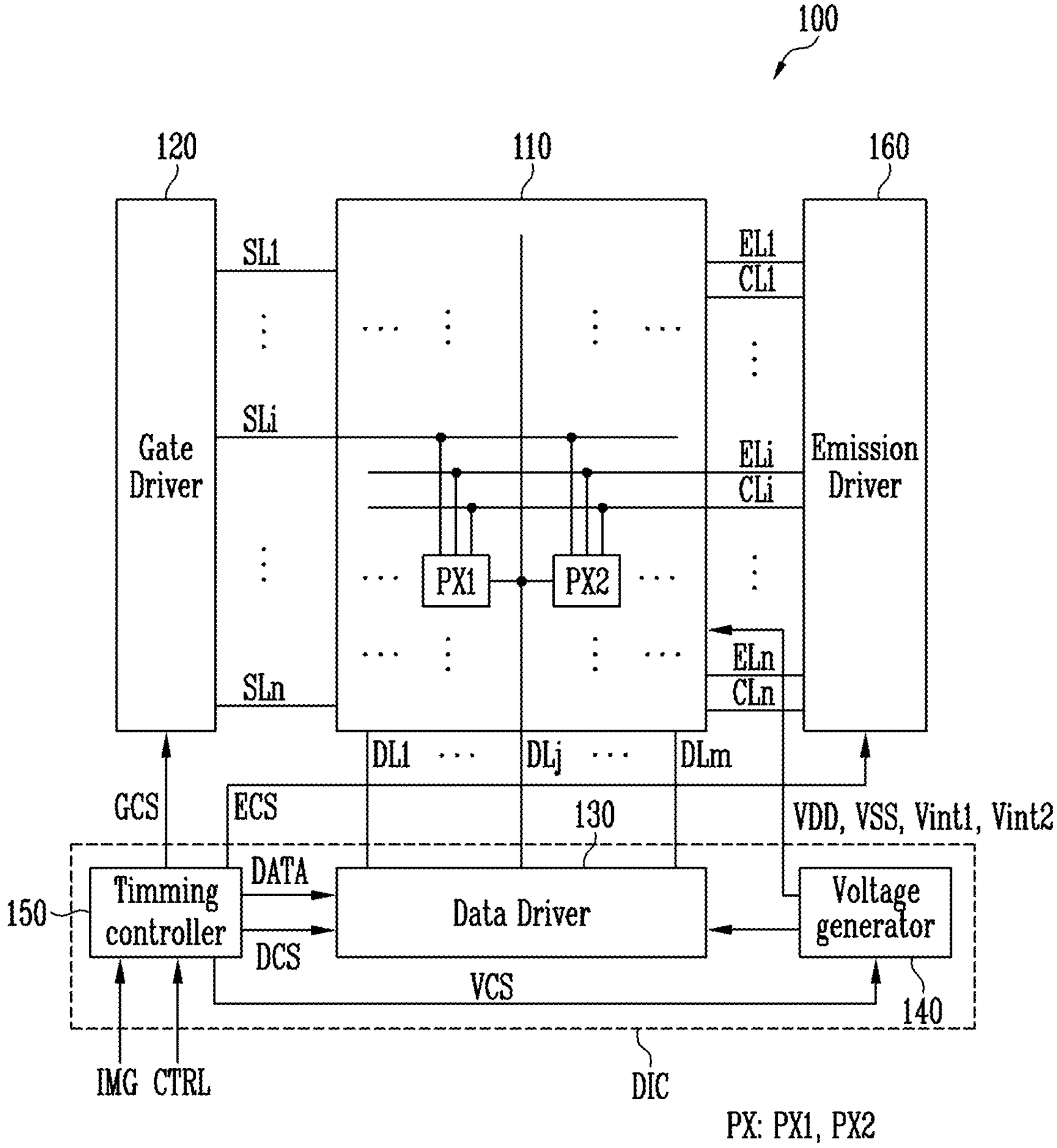
FIG. 1 is a block diagram illustrating a display device according to an embodiment supported by the present disclosure.

Hereinafter, example embodiments are described in detail with reference to the accompanying drawings such that those skilled in the art may easily practice the invention. The invention may be implemented in various different forms and is not limited to the example embodiments described in the specification.

A part irrelevant to the description may be omitted to clearly describe the invention, and the same or similar constituent elements may be designated by the same reference numerals throughout the specification. Therefore, the same reference numerals may be used in different drawings to identify the same or similar elements.

The term "substantially," as used herein, means approximately or actually. The term "substantially equal" means approximately or actually equal. The term "substantially perpendicular" means approximately or actually perpendicular. The term "substantially parallel" means approximately or actually parallel.

In some aspects, the expression "the same" in the description may mean "substantially the same." That is, with reference to elements described as being the same, the elements may be the same to the extent that a person with ordinary knowledge may understand that the elements are the same. Other expressions may also be expressions in which "substantially" is omitted.

Some embodiments are described in the attached drawings in relation to functional blocks, units, and/or modules. Those skilled in the art will appreciate that these blocks, units, and/or modules are physically implemented by logic circuits, discrete components, microprocessors, hard-wired circuits, memory elements, wiring connections, and other electronic circuits. These may be formed using semiconductor-based manufacturing techniques or other manufacturing techniques. In the case of blocks, units, and/or modules implemented by microprocessors or other similar hardware, they may be programmed and controlled using software to perform various functions discussed in the embodiments described herein, and may optionally be driven by firmware and/or software. In some aspects, each block, unit, and/or module may be implemented by dedicated hardware, or may be implemented by a combination of dedicated hardware performing some functions and processors (for example, one or more programmed microprocessors and associated circuits) performing other functions. In some embodiments, the blocks, units, and/or modules may be physically separated into two or more individual blocks, units, and/or modules that interact with each other without departing from the scope of the concept of the embodiments described herein. In some aspects, in some embodiments, blocks, units, and/or modules may be combined into physically more complex blocks, units, and/or modules within the scope of the concept of the embodiments described herein.

The term "connection" between two components may mean both electrical connection and physical connection, but is not necessarily limited thereto. For example, "connection" used based on a circuit diagram may mean electrical connection, and "connection" used based on a cross-section and a plan view may mean physical connection.

Although the terms "first," "second," and the like are used to describe various components, these components are not limited by these terms. These terms are used to distinguish one component from another. Therefore, the first component mentioned below may be the second component within the scope of the technical idea of aspects of the present disclosure.

The example embodiments of aspects of the present disclosure are not limited to the embodiments disclosed herein, and may be implemented in various forms. In some aspects, the embodiments disclosed below may be implemented alone, or may be implemented in combination with at least one other embodiment.

FIG. 1 is a block diagram illustrating a display device according to an embodiment supported by the present disclosure.

Referring to FIG. 1, a display device 100 may include a display unit (or a display panel) 110, a gate driver 120, a data driver 130, a voltage generator 140, a timing controller 150, and an emission driver 160.

The display unit 110 includes pixels PX. The pixels PX may be connected to the gate driver 120 through a first scan line SL1 to an n-th scan line SLn (where n is a natural number of 2 or more). The pixels PX may be connected to the data driver 130 through a first data line DL1 to an m-th data line DLm (where m is a natural number of 2 or more). The pixels PX may be connected to the emission driver 160 through the first emission control line EL1 to the n-th emission control line ELn. The pixels PX may be connected to the emission driver 160 through the first control line CL1 to the n-th control line CLn.

Each of the pixels PX may include at least one light-emitting element configured to generate light. Accordingly, each of the pixels PX may generate light of a specific color, such as, for example, red, green, blue, cyan, magenta, yellow, and the like.

The pixels PX may include first pixels PX1 and second pixels PX2. The first pixel PX1 and the second pixel PX2 may be positioned adjacent to each other and may receive data signals from the same data line. For example, a first pixel PX1 and a second pixel PX2 located in an i-th horizontal line (where i is a natural number of 1 or more and n or less) (pixels connected to the same scan line may form one horizontal line) are located adjacent to each other in the horizontal line and may be connected to a j-th data line DLj (which is also referred as a data line DLj) (where j is a natural number of 1 or more and m or less).

The term "adjacent" herein may refer to elements which are relatively close to each other (e.g., within a threshold distance) or elements which are in contact with each other. For example, for a pixel (e.g., first pixel PX1) described as adjacent to another pixel (e.g., second pixel PX2), another pixel is not present between the adjacent pixels.

The first pixel PX1 may receive a data signal (or a first data signal) from the data line DLj in a first period of one horizontal period 1H (see FIG. 5), and the second pixel PX2 may receive a data signal (or a second data signal) from the data line DLj in a second period different from the first period of one horizontal period 1H. That is, the first pixel PX1 and the second pixel PX2 may receive a data signal while sharing the data line DLj.

The gate driver 120 is connected to the pixels PX arranged in the row direction through the first scan line SL1 to the n-th scan line SLn. The gate driver 120 may supply a scan signal to the first scan line SL1 to the n-th scan line SLn in response to the gate driving signal GCS. In an embodiment, the gate driving signal GCS may include a start signal and clock signals.

The emission driver 160 may be connected to the pixels PX arranged in the row direction through the first emission control line EL1 to the n-th emission control line ELn. The emission driver 160 may supply an emission control signal to the first emission control line EL1 to the n-th emission control line ELn in response to the emission driving signal ECS. In an embodiment, the emission driving signal ECS may include a start signal and clock signals.

The emission driver 160 may be connected to the pixels PX arranged in the row direction through the first control line CL1 to the n-th control line CLn. The emission driver 160 may supply a control signal to the first control line CL1 to the n-th control line CLn in response to the emission driving signal ECS. In some aspects, each of the first control line CL1 to the n-th control line CLn may be selected as one of the emission control lines EL1 to ELn. For this purpose, the emission control lines EL1 to ELn may further include additional emission control lines (for example, ELn+1, ELn+2, and the like).

The gate driver 120 and the emission driver 160 may be respectively arranged on one side and the other side of the display unit 110. However, embodiments supported by the present disclosure are not limited thereto. For example, each of the gate driver 120 and the emission driver 160 may be divided into two or more physically and/or logically separated driver units, and such driver units may be arranged on one side and/or the other side of the display unit 110. The gate driver 120 and the emission driver 160 may be arranged around the display unit 110 in various forms according to embodiments.

The data driver 130 is connected to the pixels PX arranged in the column direction through the first data line DL1 to the m-th data line DLm. The data driver 130 receives image data DATA and a data driving signal DCS from the timing controller 150. The data driver 130 may supply a data signal to the data lines DL1 to DLm in response to the data driving signal DCS. In the embodiments, the data driving signal DCS may include a source start pulse signal, a source shift clock signal, a source output enable signal, and the like.

The data driver 130 may generate data signals having grayscale voltages corresponding to image data DATA using voltages from the voltage generator 140. The data driver 130 may sequentially supply a plurality of data signals, for example, two data signals, to each of the data lines DL1 to DLm during one horizontal period 1H. Some of the plurality of data signals supplied to the data lines DL1 to DLm may be supplied to the first pixels PX1, and the remainder may be supplied to the second pixels PX2. The pixels PX supplied with the data signals may generate light corresponding to the data signals. Accordingly, an image may be displayed in the display unit 110.

The voltage generator 140 may operate in response to a voltage driving signal VCS from the timing controller 150. The voltage generator 140 may generate a plurality of voltages and provide the generated voltages to components of the display device 100. For example, the voltage generator 140 may receive an input voltage from the outside of the display device 100 and generate a plurality of voltages using the received input voltage.

The voltage generator 140 may generate a first driving voltage VDD, a second driving voltage VSS, a first initialization voltage Vint1, and a second initialization voltage Vint2. The first driving voltage VDD, the second driving voltage VSS, the first initialization voltage Vint1, and the second initialization voltage Vint2 may be supplied to the pixels PX.

The first driving voltage VDD may supply current to the pixels PX, and the second driving voltage VSS may receive current from the pixels PX. The first driving voltage VDD may have a higher voltage than the second driving voltage VSS. The first initialization voltage Vint1 may be a voltage that initializes the gate electrode of the driving transistor included in each of the pixels PX, and the second initialization voltage Vint2 may be a voltage that initializes the anode electrode of the light-emitting element included in each of the pixels PX. The first initialization voltage Vint1 may be a voltage that is the same as or lower than the data signals. The second initialization voltage Vint2 may be a voltage at which the light-emitting element is turned off.

In other embodiments, at least one of the first driving voltage VDD, the second driving voltage VSS, the first initialization voltage Vint1, and the second initialization voltage Vint2 may be provided from an external device.

The timing controller 150 controls the overall operation of the display device 100. The timing controller 150 receives input image data IMG and a control signal CTRL from the outside. The timing controller 150 may generate a gate driving signal GCS, an emission driving signal ECS, a data driving signal DCS, and a voltage driving signal VCS in response to a control signal CTRL.

The timing controller 150 may convert input image data IMG to be suitable for the display device 100 or the display unit 110 and output image data DATA. In embodiments, the timing controller 150 may align the input image data IMG to be suitable for the row-level pixels PX and output image data DATA.

Two or more components among the data driver 130, the voltage generator 140, and the timing controller 150 may be mounted in a single integrated circuit. As illustrated in FIG. 1, the data driver 130, the voltage generator 140, and the timing controller 150 may be included in a driver integrated circuit DIC. In this case, the data driver 130, the voltage generator 140, and the timing controller 150 may be functionally separate components within a single driver integrated circuit DIC. In other embodiments, at least one of the data driver 130, the voltage generator 140, and the timing controller 150 may be provided as a separate component from the driver integrated circuit DIC.

Figure 2:
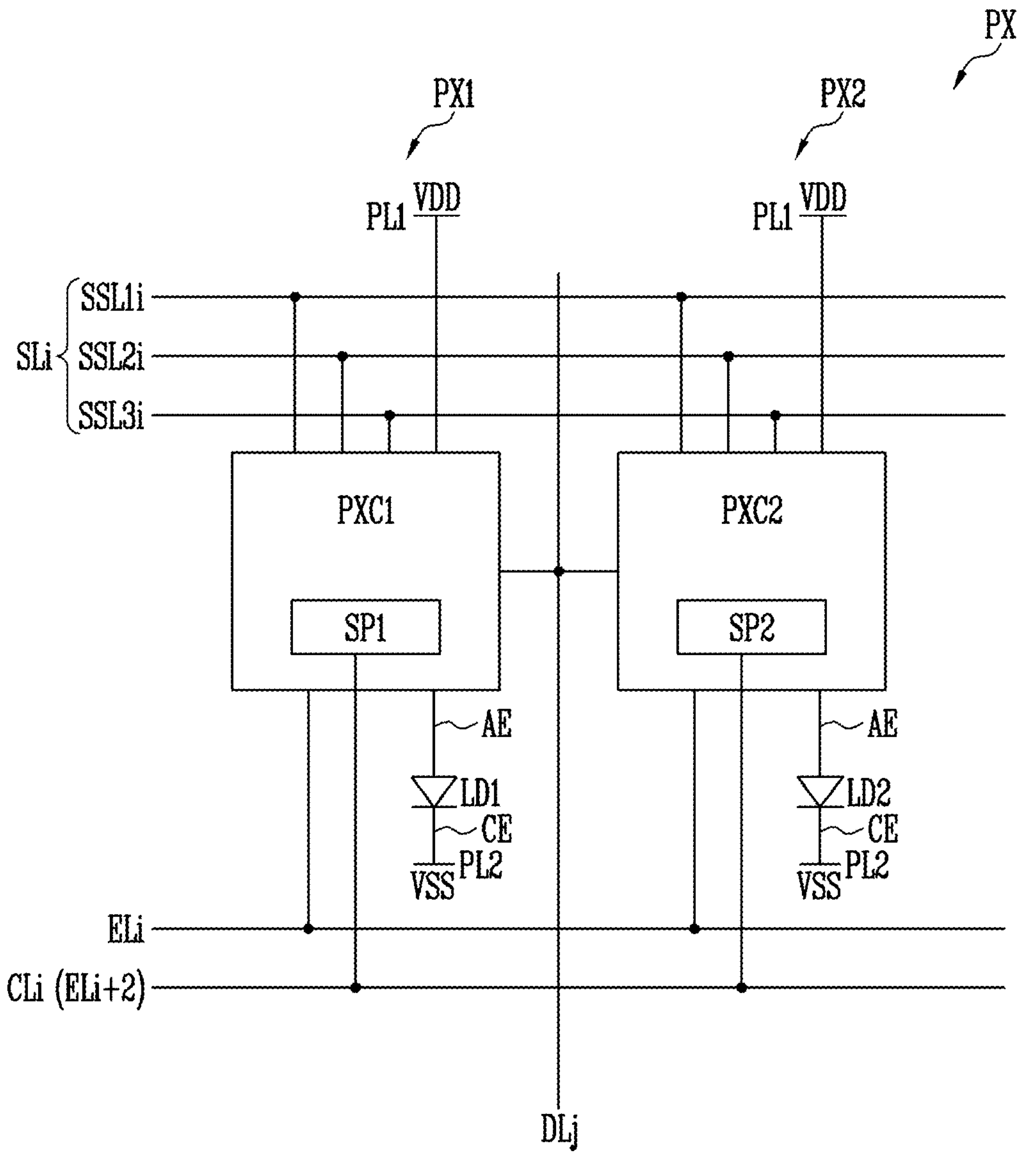
FIG. 2 is a block diagram illustrating an embodiment of a pixel illustrated in FIG. 1.

FIG. 2 is a block diagram illustrating an embodiment of the pixel illustrated in FIG. 1. In FIG. 2, examples of pixels PX arranged in the i-th row and j-th column are illustrated.

Referring to FIG. 2, the pixel PX according to the embodiment supported by the present disclosure may include a first pixel PX1 and a second pixel PX2.

The first pixel PX1 and the second pixel PX2 may include pixel circuits PXC1 and PXC2 and light-emitting elements LD1 and LD2, respectively.

An anode electrode AE of the light-emitting element LD1 and LD2 may be connected to a first power line PL1 via the pixel circuit PXC1 and PXC2, and a cathode electrode CE may be connected to a second power line PL2. The first power line PL1 may be a line that transmits (i.e., is configured to transmit) a first driving voltage VDD, and the second power line PL2 may be a line that transmits (i.e., is configured to transmit) a second driving voltage VSS. The anode electrode AE of the light-emitting element LD1 and LD2 may be connected to the first power line PL1 via one or more transistors included in the pixel circuit PXC1 and PXC2.

The pixel circuit PXC1 and PXC2 may be connected to the i-th scan line SLi, the i-th emission control line ELi (which is also referred as the emission control line ELi), and the i-th control line CLi. Here, the (i+2)-th emission control line ELi+2 may be the i-th control line CLi. The pixel circuits PXC1 and PXC2 may be connected to (or shared with) the j-th data line DLj. The pixel circuits PXC1 and PXC2 may be configured to control the light-emitting elements LD1 and LD2 according to signals received through these signal lines.

The pixel circuits PXC1 and PXC2 may operate in response to the scan signal received through the i-th scan line SLi. The i-th scan line SLi may include a first sub-scan line SSL1*i*, a second sub-scan line SSL2*i*, and a third sub-scan line SSL3*i*. For example, each of the scan lines SL1 to SLn may include three sub-scan lines. The pixel circuits PXC1 and PXC2 may operate in response to a first scan signal, a second scan signal, and a third scan signal supplied to the first sub-scan line SSL1*i*, the second sub-scan line SSL2*i*, and the third sub-scan line SSL3*i*.

The pixel circuits PXC1 and PXC2 may operate in response to an emission control signal received through the i-th emission control line ELi. The emission time of the light-emitting element LD1 and LD2 may be determined in response to a supply time of the emission control signal having a gate-off voltage.

The pixel circuits PXC1 and PXC2 may receive a data signal through the j-th data line DLj. For example, the first pixel circuit PXC1 may receive a first data signal from the j-th data line DLj during a first period of one horizontal period 1H (see FIG. 5). For example, the second pixel circuit PXC2 may receive a second data signal from the j-th data line DLj during a second period of one horizontal period 1H.

The first pixel circuit PXC1 may control the amount of current flowing from the first power line PL1 to the second power line PL2 via the first light-emitting element LD1 according to the voltage of the first data signal in response to the emission control signal received through the i-th emission control line ELi. Accordingly, the first light-emitting element LD1 may generate light having a brightness corresponding to the first data signal.

The second pixel circuit PXC2 may control the amount of current flowing from the first power line PL1 to the second power line PL2 via the second light-emitting element LD2 according to the voltage of the second data signal in response to the emission control signal received through the i-th emission control line ELi. Accordingly, the second light-emitting element LD2 may generate light having a brightness corresponding to the second data signal.

The pixel circuits PXC1 and PXC2 may receive a control signal through the i-th control line CLi. The first pixel circuit PXC1 may include a first selection unit SP1, and the first selection unit SP1 may electrically connect the driving transistor of the first pixel circuit PXC1 and the j-th data line DLj during a first period in response to the control signal input from the i-th control line CLi. In some aspects, the first selection unit SP1 may electrically disconnect the driving transistor of the first pixel circuit PXC1 and the j-th data line DLj during the second period.

The second pixel circuit PXC2 may include a second selection unit SP2, and the second selection unit SP2 may electrically connect the driving transistor of the second pixel circuit PXC2 and the j-th data line DLj during the second period in response to a control signal input from the i-th control line CLi. In some aspects, the second selection unit SP2 may electrically disconnect the driving transistor of the second pixel circuit PXC2 and the j-th data line DLj during the first period.

In an embodiment supported by the present disclosure, the first pixel PX1 may include a first selection unit SP1, and the first selection unit SP1 may control the first data signal from the data line DLj to be supplied to the driving transistor of the first pixel PX1 during the first period of one horizontal period 1H. For example, the first selection unit SP1 may be configured to transmit the first data signal from the data line DLj to the driving transistor of the first pixel PX1 during the first period of one horizontal period 1H, in response to the control signal supplied to (and input from) the i-th control line CLi. In an embodiment supported by the present disclosure, the second pixel PX2 may include a second selection unit SP2, and the second selection unit SP2 may control the second data signal from the data line DLj to be supplied to the driving transistor of the second pixel PX2 during a second period of one horizontal period 1H. For example, the second selection unit SP2 may be configured to transmit the second data signal from the data line DLj to the driving transistor of the second pixel PX2 during the second period of one horizontal period 1H, in response to the control signal supplied to (and input from) the i-th control line CLi. In this case, the first pixel PX1 and the second pixel PX2 positioned adjacent to each other may share the data line DLj.

Figure 3:
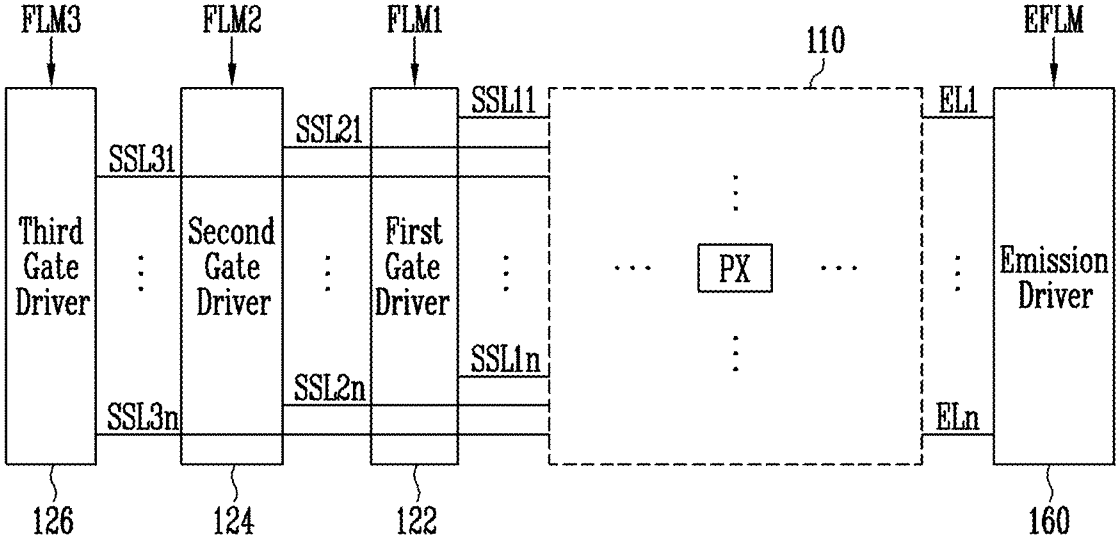
FIG. 3 is a diagram illustrating an embodiment of a gate driver configured to drive the pixel circuit illustrated in FIG. 2.

FIG. 3 is a diagram illustrating an embodiment of a gate driver configured to drive the pixel circuit illustrated in FIG. 2. The gate driving signal GCS (see FIG. 1) may include clock signals not illustrated, a first scan start signal FLM1, a second scan start signal FLM2, and a third scan start signal FLM3. The emission driving signal ECS (see FIG. 1) may include clock signals not illustrated and an emission start signal EFLM.

Referring to FIG. 3, the gate driver 120 may include a first gate driver 122, a second gate driver 124, and a third gate driver 126.

The first gate driver 122 may receive a first scan start signal FLM1 and generate a first scan signal of a gate-on voltage while shifting the first scan start signal FLM1 in response to a clock signal. The first gate driver 122 may sequentially supply the first scan signal to the first sub-scan lines SSL11 to SSL1*n*.

The second gate driver 124 may receive a second scan start signal FLM2 and generate a second scan signal of a gate-on voltage while shifting the second scan start signal FLM2 in response to a clock signal. The second gate driver 124 may sequentially supply the second scan signal to the second sub-scan lines SSL21 to SSL2*n*.

The third gate driver 126 may receive the third scan start signal FLM3 and generate the third scan signal of the gate-on voltage while shifting the third scan start signal FLM3 in response to the clock signal. The third gate driver 126 may sequentially supply the third scan signal to the third sub-scan lines SSL31 to SSL3*n*.

The first scan signal, the second scan signal, and the third scan signal may have a gate-on voltage which, when provided to transistors included in each of the pixels PX, may turn on the transistors. For example, a scan signal of a logic low level may be supplied to a P-type transistor, and a scan signal of a logic high level may be supplied to an N-type transistor. In an embodiment, the first scan signal, the second scan signal, and the third scan signal may be at a logic high level. Hereinafter, descriptions of the first scan signal, the second scan signal, and the third scan signal are supplied may mean that the first scan signal, the second scan signal, and the third scan signal of the gate-on voltage are supplied to the sub-scan lines SSL11 to SSL1*n*, SSL21 to SSL2*n*, and SSL31 to SSL3*n*.

The emission driver 160 may generate an emission control signal while shifting the emission start signal EFLM in response to the clock signal. The emission driver 160 may sequentially supply the emission control signal to the emission control lines EL1 to ELn. The emission control signal may be set to a gate-off voltage such that the transistors included in the pixels PX may be turned off.

For example, an emission control signal of a logic high level may be supplied to a P-type transistor, and an emission control signal of a logic low level may be supplied to an N-type transistor. In an embodiment, the emission control signal may be a logic high level.

Figure 4:
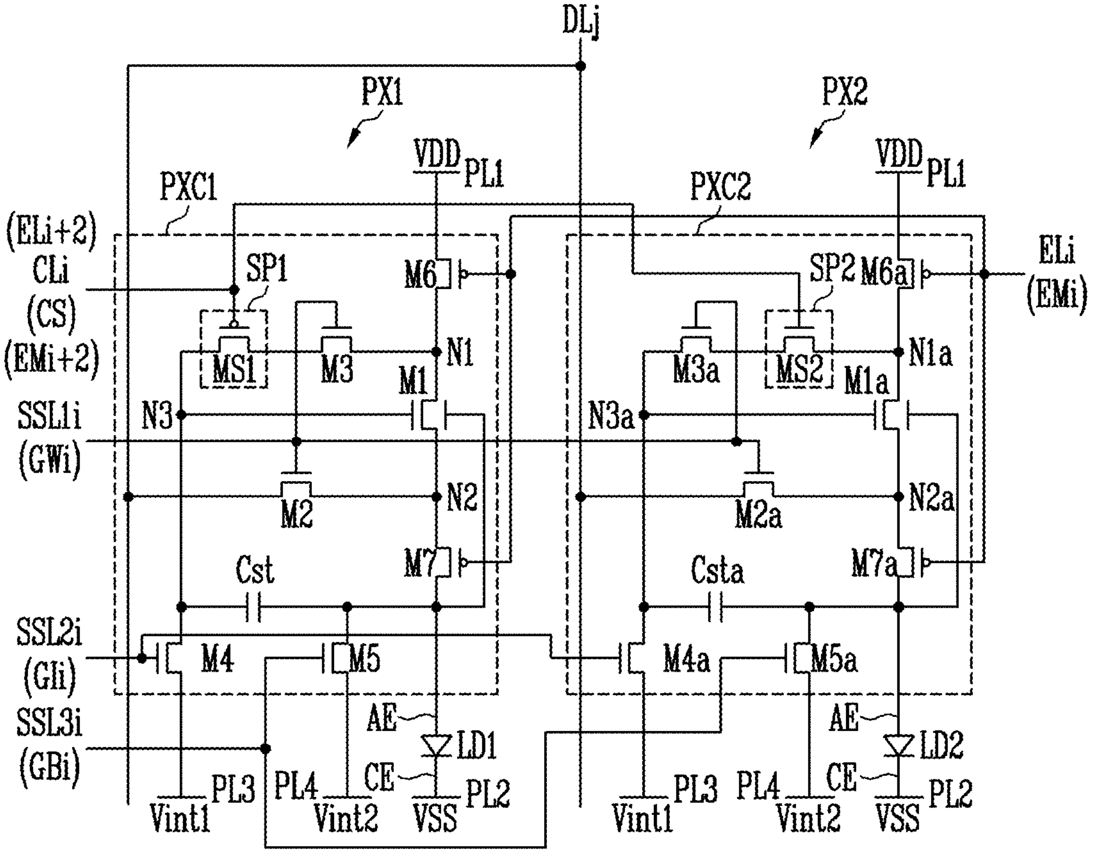
FIG. 4 is a diagram illustrating an embodiment of the pixel circuit illustrated in FIG. 2.

FIG. 4 is a diagram illustrating an embodiment of the pixel circuit illustrated in FIG. 2.

Referring to FIG. 4, the first pixel circuit PXC1 may include a first transistor M1, a second transistor M2, a third transistor M3, a fourth transistor M4, a fifth transistor M5, a sixth transistor M6, a seventh transistor M7, a storage capacitor Cst, and a first selection unit SP1.

The second pixel circuit PXC2 may include a first transistor M1*a*, a second transistor M2*a*, a third transistor M3*a*, a fourth transistor M4*a*, a fifth transistor M5*a*, a sixth transistor M6*a*, a seventh transistor M7*a*, a storage capacitor Csta, and a second selection unit SP2. The structure of the second pixel circuit PXC2 excluding the second selection unit SP2 may be substantially the same as the structure of the first pixel circuit PXC1. Hereinafter, a circuit configuration will be described using a first pixel circuit PXC1 and a first light-emitting element LD1 connected to the first pixel circuit PXC1.

The first light-emitting element LD1 may include an anode electrode AE, a cathode electrode CE, and a light-emitting layer. The light-emitting layer may be arranged between the anode electrode AE and the cathode electrode CE. The anode electrode AE of the first light-emitting element LD1 may be electrically connected to a first power line PL1 via a seventh transistor M7, a second node N2, a first transistor M1, a first node N1, and a sixth transistor M6, and the cathode electrode CE of the first light-emitting element LD1 may be electrically connected to a second power line PL2. The first light-emitting element LD1 may generate light of a predetermined brightness in response to the amount of current supplied from the first power line PL1 to the second power line PL2 via the first pixel circuit PXC1.

The first light-emitting element LD1 may be an organic light-emitting diode. In some aspects, the first light-emitting element LD1 may be an inorganic light-emitting diode such as, for example, a micro LED (light-emitting diode) or a quantum dot light-emitting diode. In some aspects, the first light-emitting element LD1 may be a composite element composed of an organic material and an inorganic material. In FIG. 4, the first pixel circuit PXC1 is illustrated as being connected to a single first light-emitting element LD1. However, in another embodiment, the first pixel circuit PXC1 may be connected to a plurality of first light-emitting elements LD1, and the plurality of first light-emitting elements LD1 may be connected to each other in series, parallel, or series-parallel.

The first electrode of the first transistor M1 may be connected to the first power line PL1 via the first node N1, and the second electrode may be connected to the second node N2. Here, being connected includes the meaning of being electrically connected. The gate electrode of the first transistor M1 may be connected to the third node N3. The first node N1 may mean a node connected to the second electrode of the sixth transistor M6, and the second node N2 may mean a node connected to the first electrode of the seventh transistor M7. The first transistor M1 may control the amount of current flowing from the first power line PL1 to the second power line PL2 via the first light-emitting element LD1 in response to the voltage of the third node N3. In some aspects, the first transistor M1 may include a body electrode, and the body electrode may be connected to the anode electrode AE of the first light-emitting element LD1.

The second transistor M2 may be connected between the j-th data line DLj and the second node N2. In some aspects, the gate electrode of the second transistor M2 may be connected to the i-th first sub-scan line SSL1*i* (or the first sub-scan line SSL1*i*). The second transistor M2 of this type may turn on when the first scan signal GWi (or the i-th first scan signal GWi) of the gate-on voltage is supplied to the first sub-scan line SSL1*i*, thereby electrically connecting the data line DLj and the second node N2.

The third transistor M3 may be connected between the first node N1 and the third node N3. The gate electrode of the third transistor M3 may be connected to the first sub-scan line SSL1*i*. The third transistor M3 of this type may turn on when the first scan signal GWi of the gate-on voltage is supplied to the first sub-scan line SSL1*i*.

The fourth transistor M4 may be connected between the third node N3 and the third power line PL3. The gate electrode of the fourth transistor M4 may be connected to the i-th second sub-scan line SSL2*i* (or the second sub-scan line SSL2*i*). The fourth transistor M4 may turn on when the second scan signal GIi (or the i-th second scan signal GIi) of the gate-on voltage is supplied to the second sub-scan line SSL2*i*, thereby electrically connecting the third power line PL3 and the third node N3. The third power line PL3 may be a line that transmits (i.e., is configured to transmit) the first initialization voltage Vint1.

The fifth transistor M5 may be connected between the anode electrode AE of the first light-emitting element LD1 and the fourth power line PL4. The gate electrode of the fifth transistor M5 may be connected to the i-th third sub-scan line SSL3*i* (or the third sub-scan line SSL3*i*). The fifth transistor M5 of this type may turn on when a third scan signal GBi (or an i-th third scan signal GBi) of a gate-on voltage is supplied to the third sub-scan line SSL3*i*, thereby electrically connecting the fourth power line PL4 and the anode electrode AE of the first light-emitting element LD1. The fourth power line PL4 may be a line that transmits (i.e., is configured to transmit) the second initialization voltage Vint2.

The sixth transistor M6 may be connected between the first power line PL1 and the first node N1. In some aspects, the gate electrode of the sixth transistor M6 may be connected to the i-th emission control line ELi. The sixth transistor M6 of this type may be turned off when an emission control signal EMi (or an i-th emission control signal EMi) of a gate-off voltage (or a logic low level) is supplied to the emission control line ELi. In an example in which the sixth transistor M6 is turned off, the first power line PL1 and the first node N1 may be electrically disconnected, and accordingly, the first pixel PX1 may be set to a non-emission state.

The seventh transistor M7 may be connected between the second node N2 and the anode electrode AE of the first light-emitting element LD1. In some aspects, the gate electrode of the seventh transistor M7 may be connected to the emission control line ELi. The seventh transistor M7 may be turned off when the emission control signal EMi of the gate-off voltage is supplied to the emission control line ELi. In an example in which the seventh transistor M7 is turned off, the second node N2 and the anode electrode AE of the first light-emitting element LD1 may be electrically disconnected, and accordingly, the first pixel PX1 may be set to a non-emission state.

The storage capacitor Cst may be connected between the third node N3 and the anode electrode AE of the first light-emitting element LD1. The storage capacitor Cst may store the voltage of the third node N3.

The first transistor M1, the second transistor M2, the third transistor M3, the fourth transistor M4, and the fifth transistor M5 may be formed as N-type transistors, and the sixth transistor M6 and the seventh transistor M7 may be formed as P-type transistors.

The first selection unit SP1 included in the first pixel PX1 may be connected between the third transistor M3 and the third node N3. The first selection unit SP1 may be provided with a first selection transistor MS1 connected between the third transistor M3 and the third node N3 and having a gate electrode connected to the i-th control line CLi. The first selection transistor MS1 may be formed as a P-type transistor. However, embodiments supported by the present disclosure are not limited thereto, and the first selection transistor MS1 may be connected between the third transistor M3 and the first node N1.

The i-th control line CLi may be an emission control line located in the next horizontal line, for example, the (i+2)-th emission control line ELi+2. In this case, the control signal CS supplied to the i-th control line CLi may be the (i+2)-th emission control signal EMi+2. The first selection transistor MS1 may turn on when the (i+2)-th emission control signal EMi+2 (or the control signal CS) of the logic low level is supplied, and may electrically connect the third transistor M3 and the third node N3.

In some aspects, the first selection transistor MS1 may have a turn-on period that partially overlaps with the third transistor M3 and may be turned off before the third transistor M3. If the first selection transistor MS1 is turned off before the third transistor M3, the kickback voltage due to the turn-off of the third transistor M3 may be prevented from being transmitted to the third node N3.

The second selection unit SP2 included in the second pixel PX2 may be connected between the third transistor M3*a* and the first node N1*a*. The second selection unit SP2 may be connected between the third transistor M3*a* and the first node N1*a*, and may include a second selection transistor MS2 whose gate electrode is connected to the i-th control line CLi (that is, the (i+2)-th emission control line ELi+2). The second selection transistor MS2 may be formed as an N-type transistor. However, embodiments supported by the present disclosure are not limited thereto, and the second selection transistor MS2 may be connected between the third transistor M3*a* and the third node N3*a*.

The second selection transistor MS2 may turn on when the (i+2)-th emission control signal EMi+2 (or control signal CS) of the logic high level is supplied, and may electrically connect the third transistor M3*a* and the first node N1*a*.

In some aspects, the second selection transistor MS2 may have a turn-on period that partially overlaps with the third transistor M3*a*, and may be turned off later than the third transistor M3*a*. In an example in which the second selection transistor MS2 is turned off later than the third transistor M3*a*, the kickback voltage due to the turn-off of the second selection transistor MS2 may be prevented from being transmitted to the third node N3*a*.

In some embodiments, the first transistor M1*a* included in the second pixel PX2 is connected between the first node N1*a* and the second node N2*a*, and the gate electrode is connected to the third node N3*a*. That is, the first transistor M1*a* included in the second pixel PX2 may be connected in a form substantially identical to the first transistor M1 included in the first pixel PX1. The connection relationship of the remaining transistors M2*a* to M7*a* included in the second pixel PX2 may also be substantially identical to the transistors M2 to M7 included in the first pixel PX1.

Figure 5:
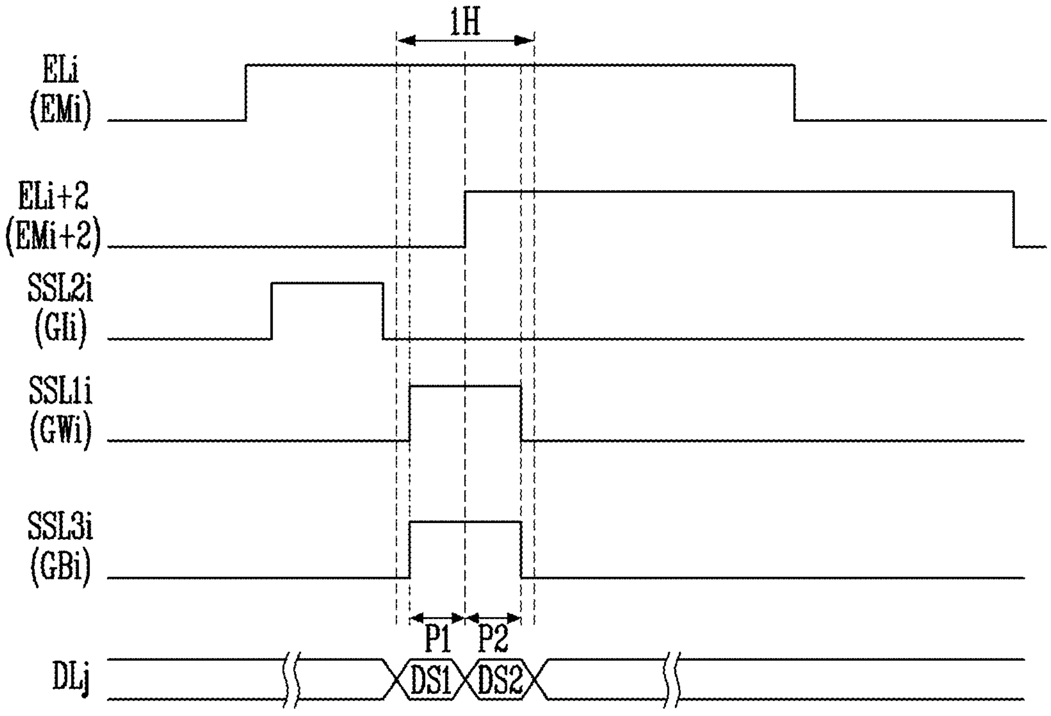
FIG. 5 is a waveform diagram illustrating an embodiment of the operation process of the pixel illustrated in FIG. 4.

FIG. 5 is a waveform diagram illustrating an embodiment of the operation process of the pixel illustrated in FIG. 4.

Referring to FIG. 5, the gate driver 120 (see FIG. 1) may supply a second scan signal GIi of a gate-on voltage to the second sub-scan line SSL2*i*, and then supply a first scan signal GWi of a gate-on voltage to the first sub-scan line SSL1*i*. Then, the gate driver 120 may supply a third scan signal GBi of a gate-on voltage to the third sub-scan line SSL3*i* such that the third scan signal GBi overlaps with the first scan signal GWi supplied to the first sub-scan line SSL1*i*. In an example in which the third scan signal GBi is supplied such that the third scan signal GBi overlaps with the first scan signal GWi, the third sub-scan line SSL3*i* may be replaced with the first sub-scan line SSL1*i*, and in this case, the third sub-scan line SSL3*i* may be removed.

The emission driver 160 (see FIG. 1) may supply an emission control signal EMi of a logic high level to the i-th emission control line ELi such that the emission control signal EMi overlaps with the second scan signal GIi, the first scan signal GWi, and the third scan signal GBi. In some aspects, the emission driver 160 may supply an emission control signal EMi+2 of a logic high level to the (i+2)-th emission control line ELi+2 such that the emission control signal EMi+2 overlaps with the first scan signal GWi and the third scan signal GBi for a certain period of time.

Here, a period during which the (i+2)-th emission control signal EMi+2 of a logic low level and the i-th first scan signal GWi of a high level (that is, gate-on voltage) overlap may be set as a first period P1, and a period during which the (i+2)-th emission control signal EMi+2 of a logic high level and the i-th first scan signal GWi of a high level (that is, gate-on voltage) overlap may be set as a second period P2.

The data driver 130 (see FIG. 1) may supply a first data signal DS1 corresponding to the first pixel PX1 (see FIG. 1) to the data line DLj during the first period P1, and supply a second data signal DS2 corresponding to the second pixel PX2 (see FIG. 1) to the data line DLj during the second period P2. The first data signal DS1 may be supplied to the first pixel PX1, and the second data signal DS2 may be supplied to the second pixel PX2.

That is, the data driver 130 sequentially supplies the first data signal DS1 and the second data signal DS2 to the data line DLj for one horizontal period 1H, and the first data signal DS1 and the second data signal DS2 may be supplied to the first pixel PX1 and the second pixel PX2, respectively. In this embodiment of the present disclosure, a separate demultiplexer is not included, and one data line DLj may be shared by adjacent pixels PX1 and PX2.

FIGS. 6A to 6D are diagrams illustrating the operation process of a pixel corresponding to the driving method of FIG. 5.

Figure 6A:
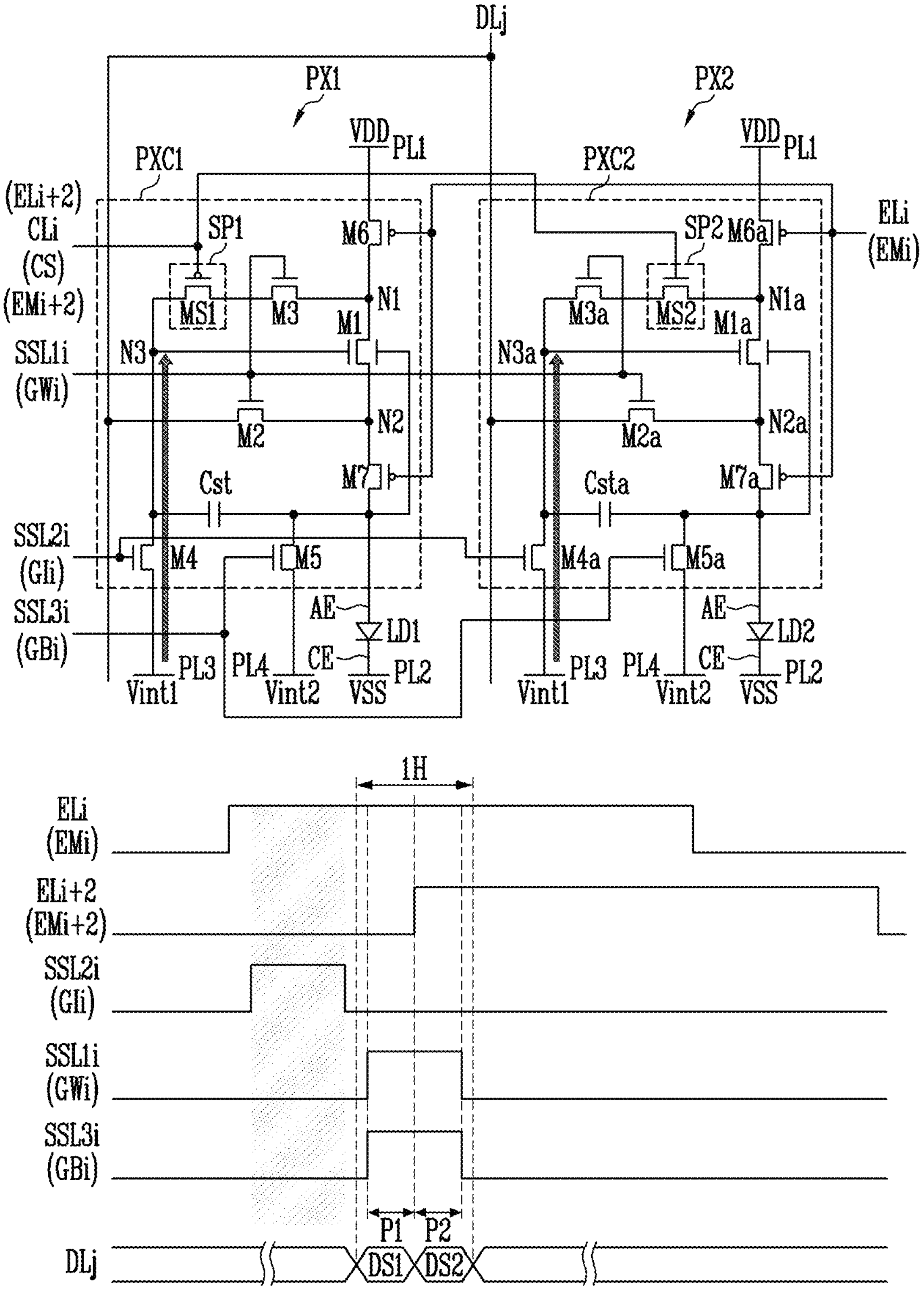
FIGS. 6A to 6D are diagrams illustrating an embodiment of the operation process of the pixel corresponding to the driving method of FIG. 5.

Referring to FIG. 6A, first, the i-th emission control signal EMi of a logic high level is supplied to the i-th emission control line ELi. In an example in which the i-th emission control signal EMi of a logic high level is supplied, the sixth transistors M6 and M6*a* and the seventh transistors M7 and M7*a* are turned off. In an example in which the sixth transistors M6 and M6*a* and the seventh transistors M7 and M7*a* are turned off, the pixels PX1 and PX2 are set to a non-emission state.

Thereafter, a second scan signal GIi of a gate-on voltage (or a logic high level) may be supplied to the second sub-scan line SSL2*i*. In an example in which the second scan signal GIi of the gate-on voltage is supplied, the fourth transistors M4 and M4*a* are turned on. In an example in which the fourth transistors M4 and M4*a* are turned on, a first initialization voltage Vint1 is supplied to third nodes N3 and N3*a*, and accordingly, the third nodes N3 and N3*a* may be initialized to the first initialization voltage Vint1.

Figure 6B:
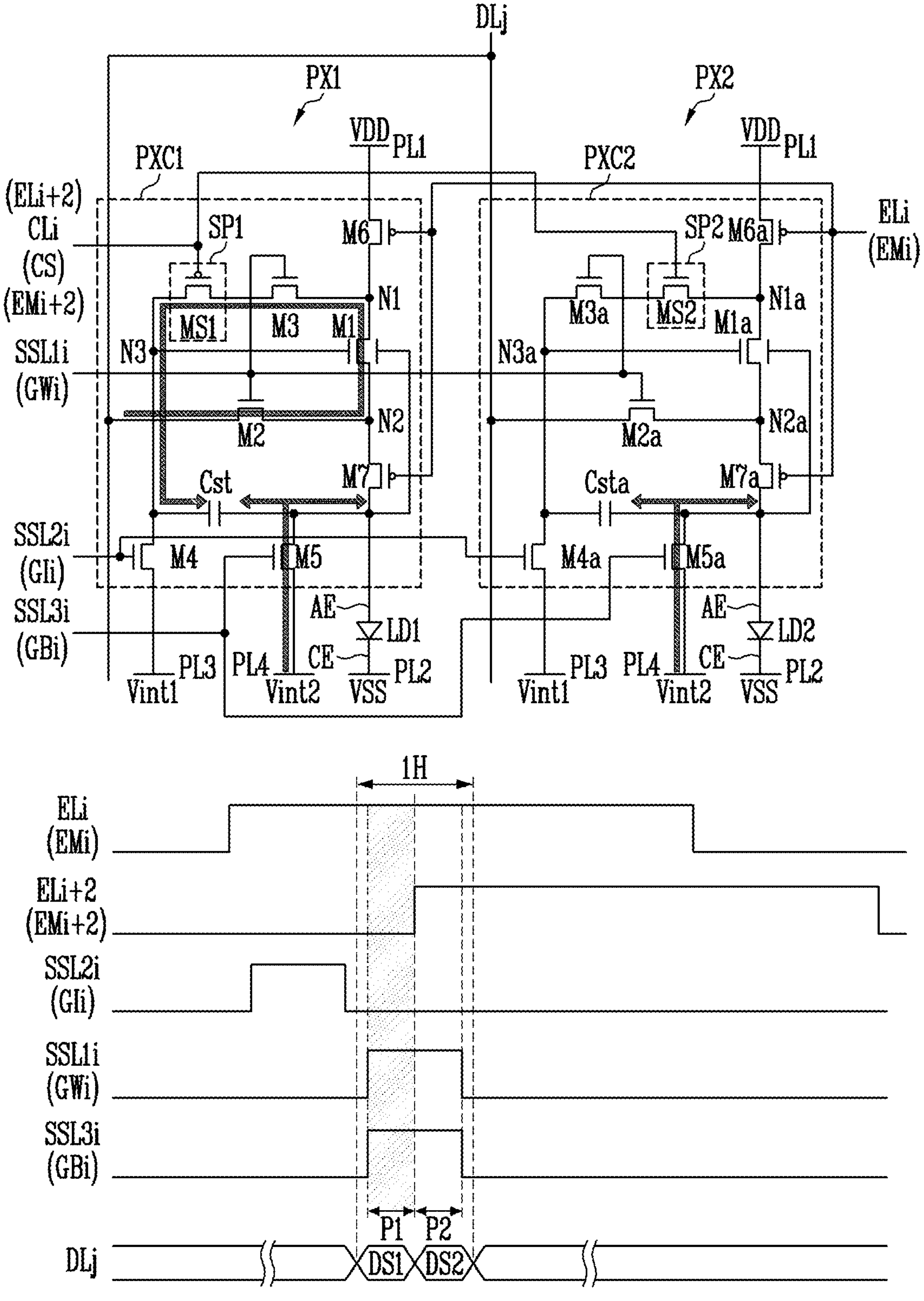

Referring to FIG. 6B, a first scan signal GWi of a gate-on voltage (or a logic high level) may be supplied to a first sub-scan line SSL1*i*, and a third scan signal GBi of a gate-on voltage (or a logic high level) may be supplied to a third sub-scan line SSL3*i*. In some aspects, an emission control signal EMi+2 of a logic low level may be supplied to an (i+2)-th emission control line ELi+2 during a first period P1, and an emission control signal EMi+2 of a logic high level may be supplied to an (i+2)-th emission control line ELi+2 during a predetermined period including a second period P2.

When the first scan signal GWi of a gate-on voltage is supplied to the first sub-scan line SSL1*i*, the second transistors M2 and M2*a* and the third transistors M3 and M3*a* are turned on. In some aspects, during the first period P1, the first selection transistor MS1 is turned on in response to the logic low level voltage supplied to the (i+2)-th emission control line ELi+2.

Then, the first data signal DS1 supplied to the data line DLj may be supplied to the third node N3 via the second node N2 and the first transistor M1 connected in a diode form. At this time, a voltage compensated for the threshold voltage of the first transistor M1 is applied to the third node N3 by the first transistor M1 connected in a diode form. The storage capacitor Cst stores the voltage of the third node N3.

In some embodiments, the second selection transistor MS2 is turned off in response to the logic low level voltage supplied to the (i+2)-th emission control line ELi+2 during the first period P1. In an example in which the second selection transistor MS2 is turned off, the first data signal DS1 from the data line DLj is not supplied to the third node N3*a* of the second pixel PX2.

When the third scan signal GBi of the gate-on voltage is supplied to the third sub-scan line SSL3*i*, the fifth transistors M5 and M5*a* may turn on. In an example in which the fifth transistors M5 and Ma is turned on, the second initialization voltage Vint2 may be supplied to the anode electrode AE of the light-emitting element LD1 and LD2, and thus the black expression capability may be improved.

Figure 6C:
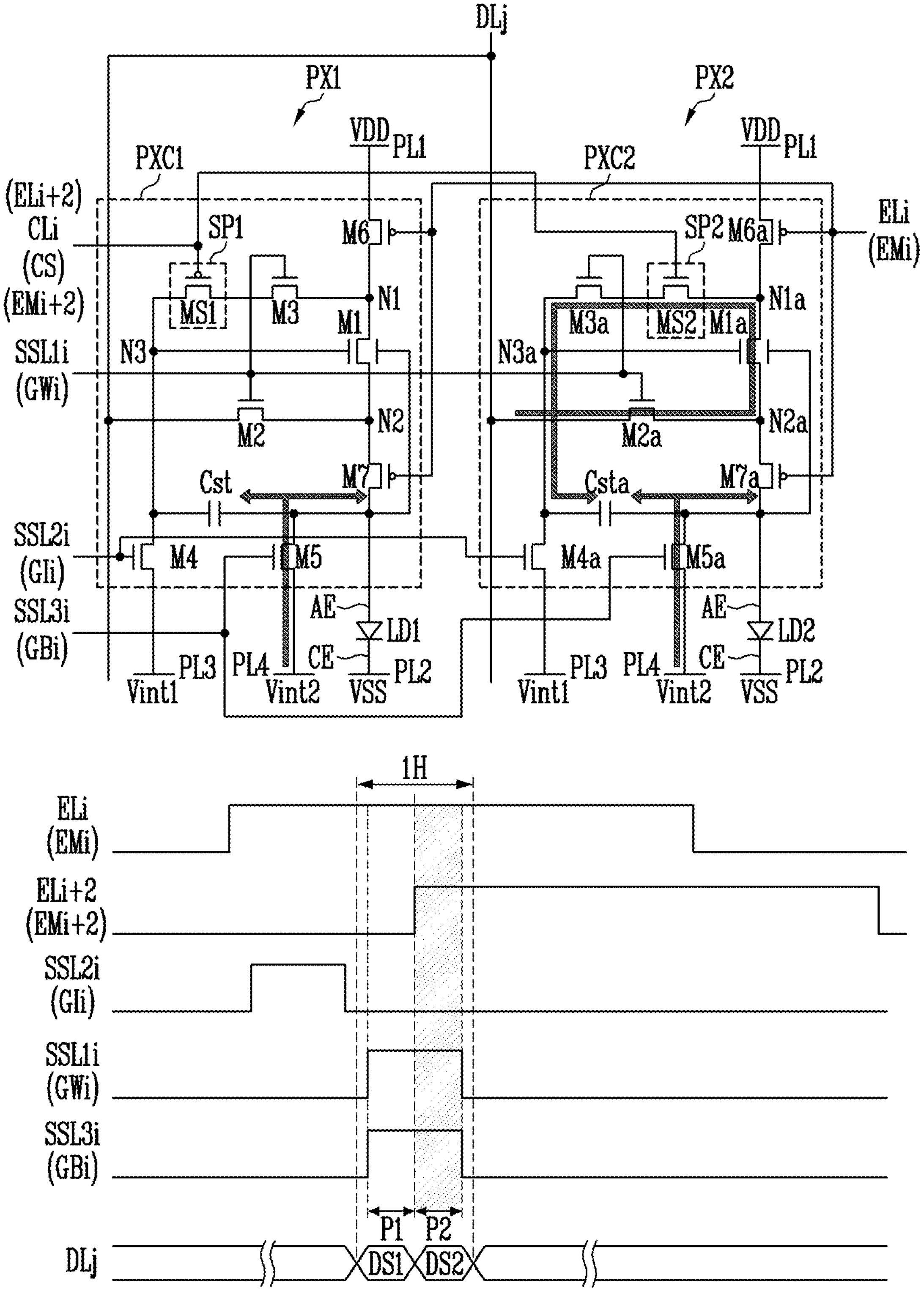

Referring to FIG. 6C, the second selection transistor MS2 is turned on in response to the logic high level voltage supplied to the (i+2)-th emission control line ELi+2 during the second period P2.

Then, the second data signal DS2 supplied to the data line DLj may be supplied to the third node N3*a* via the second node N2*a* and the first transistor M1*a* connected in a diode form. At this time, a voltage compensated for the threshold voltage of the first transistor M1*a* is applied to the third node N3*a* by the first transistor M1*a* connected in a diode form. The storage capacitor Csta stores the voltage of the third node N3*a*.

In some embodiments, the first selection transistor MS1 is turned off in response to the logic high level voltage supplied to the (i+2)-th emission control line ELi+2 during the second period P2. In an example in which the first selection transistor MS1 is turned off, the second data signal DS2 from the data line DLj is not supplied to the third node N3 of the first pixel PX1. During the second period P2, the first pixel PX1 may maintain the voltage of the first data signal DS1.

Figure 6D:
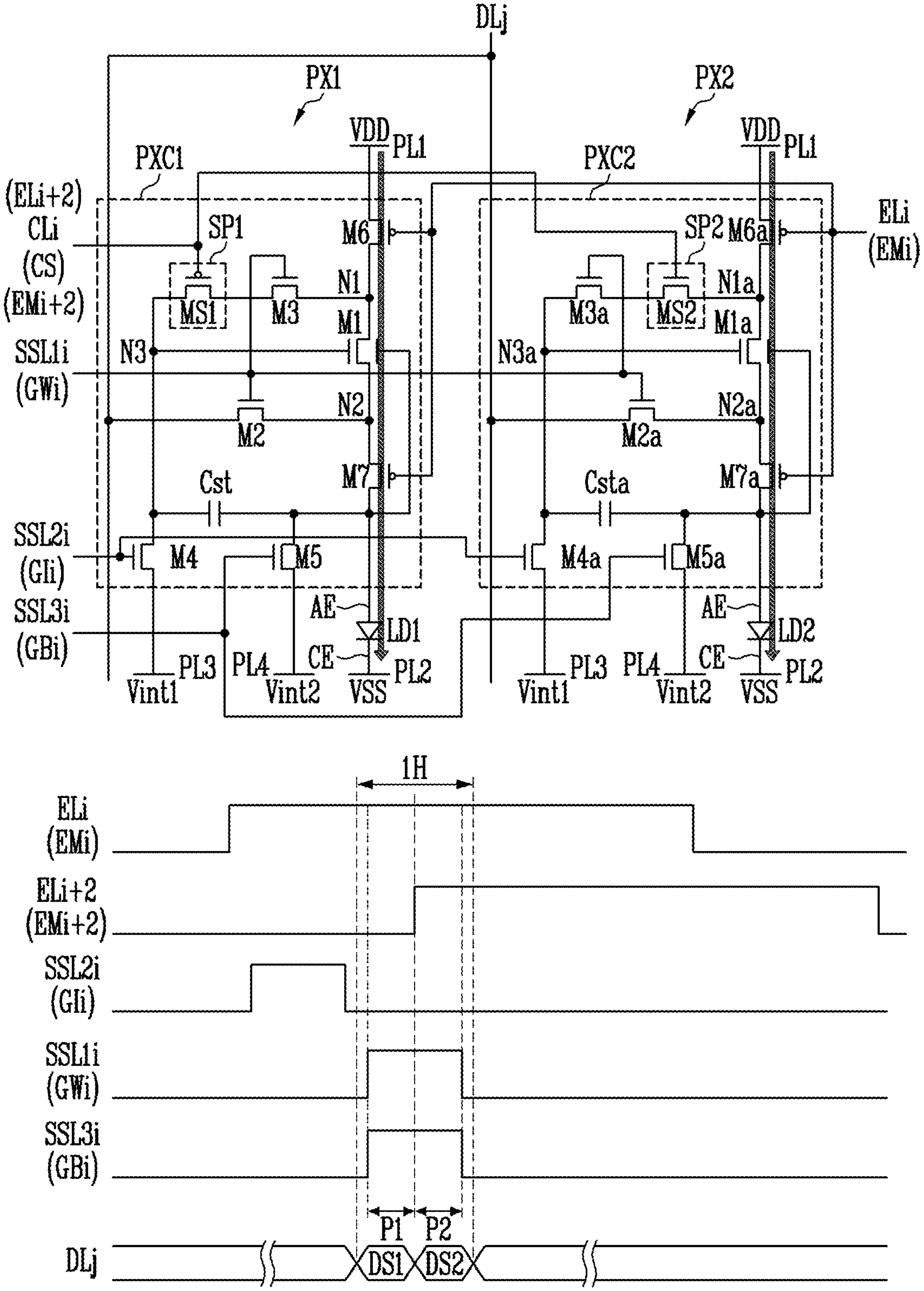

Referring to FIG. 6D, after the voltage of the data signal DS1 and DS2 is stored in the first pixel PX1 and the second pixel PX2, an emission control signal EMi of a logic low level is supplied to the i-th emission control line ELi. In an example in which the emission control signal EMi of the logic low level is supplied to the i-th emission control line ELi, the sixth transistor M6 and M6*a* and the seventh transistor M7 and M7*a* are turned on.

The first transistor M1 may supply a predetermined driving current from the first power line PL1 to the second power line PL2 via the first light-emitting element LD1 in response to the voltage of the third node N3, and accordingly, the first light-emitting element LD1 may generate light having a brightness corresponding to the first data signal DS1.

The first transistor M1*a* may supply a predetermined driving current from the first power line PL1 to the second power line PL2 via the second light-emitting element LD2 in response to the voltage of the third node N3*a*, and accordingly, the second light-emitting element LD2 may generate light having a brightness corresponding to the second data signal DS2.

Figure 7:
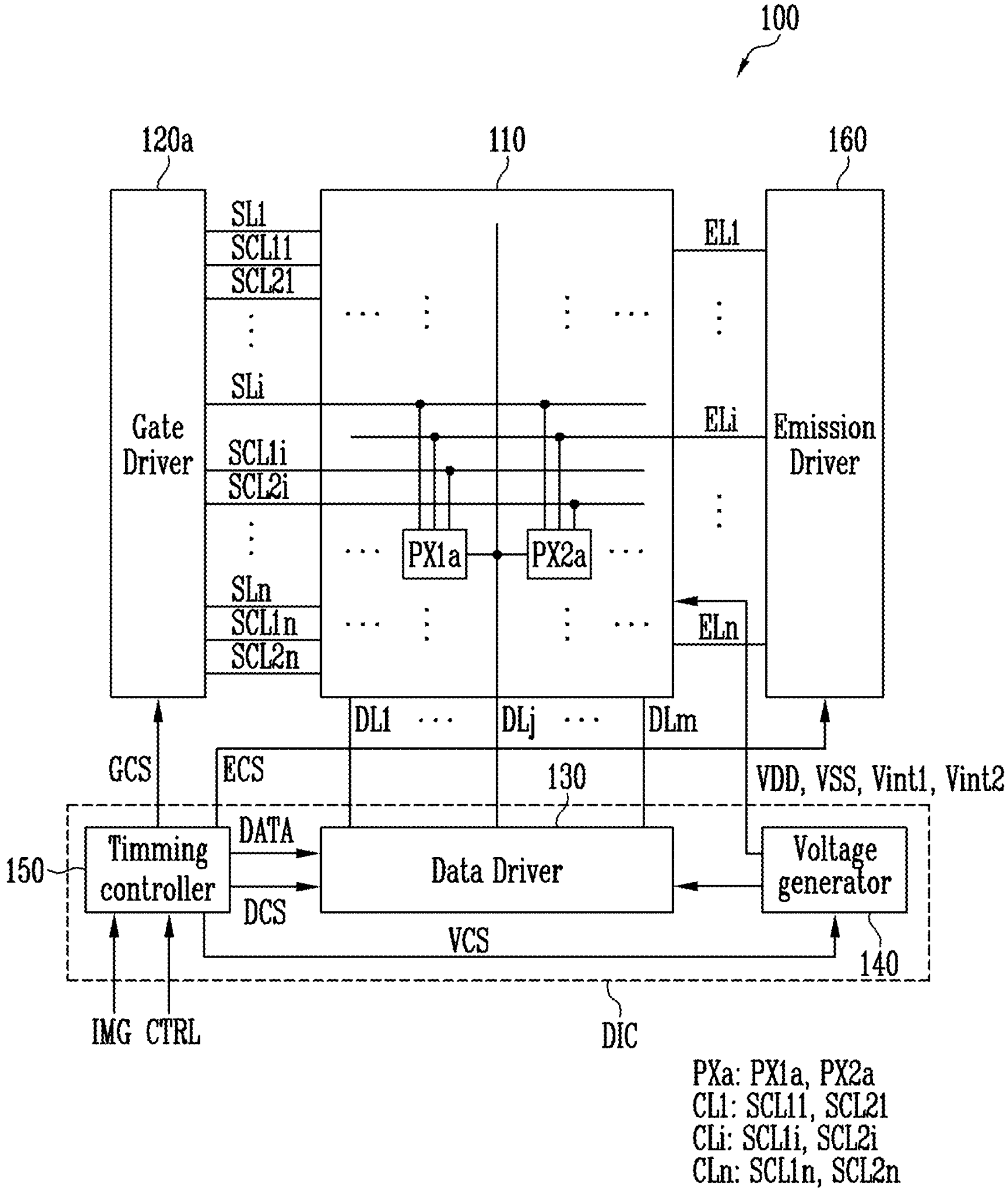
FIG. 7 is a diagram illustrating a display device according to an embodiment supported by the present disclosure.

FIG. 7 is a drawing illustrating a display device according to an embodiment supported by the present disclosure. In describing FIG. 7, the same drawing reference numerals are assigned to the same components as those in FIG. 1, and duplicate descriptions are omitted.

Referring to FIG. 7, the display device 100 may include a display unit (or a display panel) 110, a gate driver 120*a*, a data driver 130, a voltage generator 140, a timing controller 150, and an emission driver 160.

The gate driver 120*a* is connected to pixels PXa arranged in the row direction through the first scan line SL1 to the n-th scan line SLn. The gate driver 120*a* is connected to pixels PXa arranged in the row direction through the control lines CL1, . . . , CLi, . . . , and CLn.

Each of the control lines CL1 to CLn may include first sub-control lines SCL11, . . . , SCL1*i*, . . . , and SCL1*n* and second sub-control lines SCL21, . . . , SCL2*i*, . . . , and SCL2*n*. For example, the first control line CL1 may include the first sub-control line SCL11 and the second sub-control line SCL21. For example, the i-th control line CLi may include the first sub-control line SCL1*i* and the second sub-control line SCL2*i*. For example, the n-th control line CLn may include the first sub-control line SCL1*n* and the second sub-control line SCL2*n*.

The gate driver 120*a* may supply a control signal to the control lines CL1 to CLn. The gate driver 120*a* may sequentially supply a first control signal of a gate-on voltage (for example, a logic high level) to the first sub-control lines SCL11 to SCL1*n*. The gate driver 120*a* may sequentially supply a second control signal of a gate-on voltage (for example, a logic high level) to the second sub-control lines SCL21 to SCL2*n*.

The pixels PXa may include first pixels PX1*a* and second pixels PX2*a*. The first pixel PX1*a* and the second pixel PX2*a* may be positioned adjacent to each other and may receive a data signal from the same data line. For example, the first pixel PX1*a* and the second pixel PX2*a* positioned adjacent to each other in the i-th horizontal line may be connected to the j-th data line DLj.

The first pixel PX1*a* may receive a data signal (or a first data signal) from the data line DLj in the first period of one horizontal period 1H (see FIG. 5) in response to the first control signal supplied to the first sub-control line SCL1*i*. The second pixel PX2*a* may receive a data signal (or a second data signal) from the data line DLj in the second period of one horizontal period 1H in response to the second control signal supplied to the second sub-control line SCL2*i*.

Figure 8:
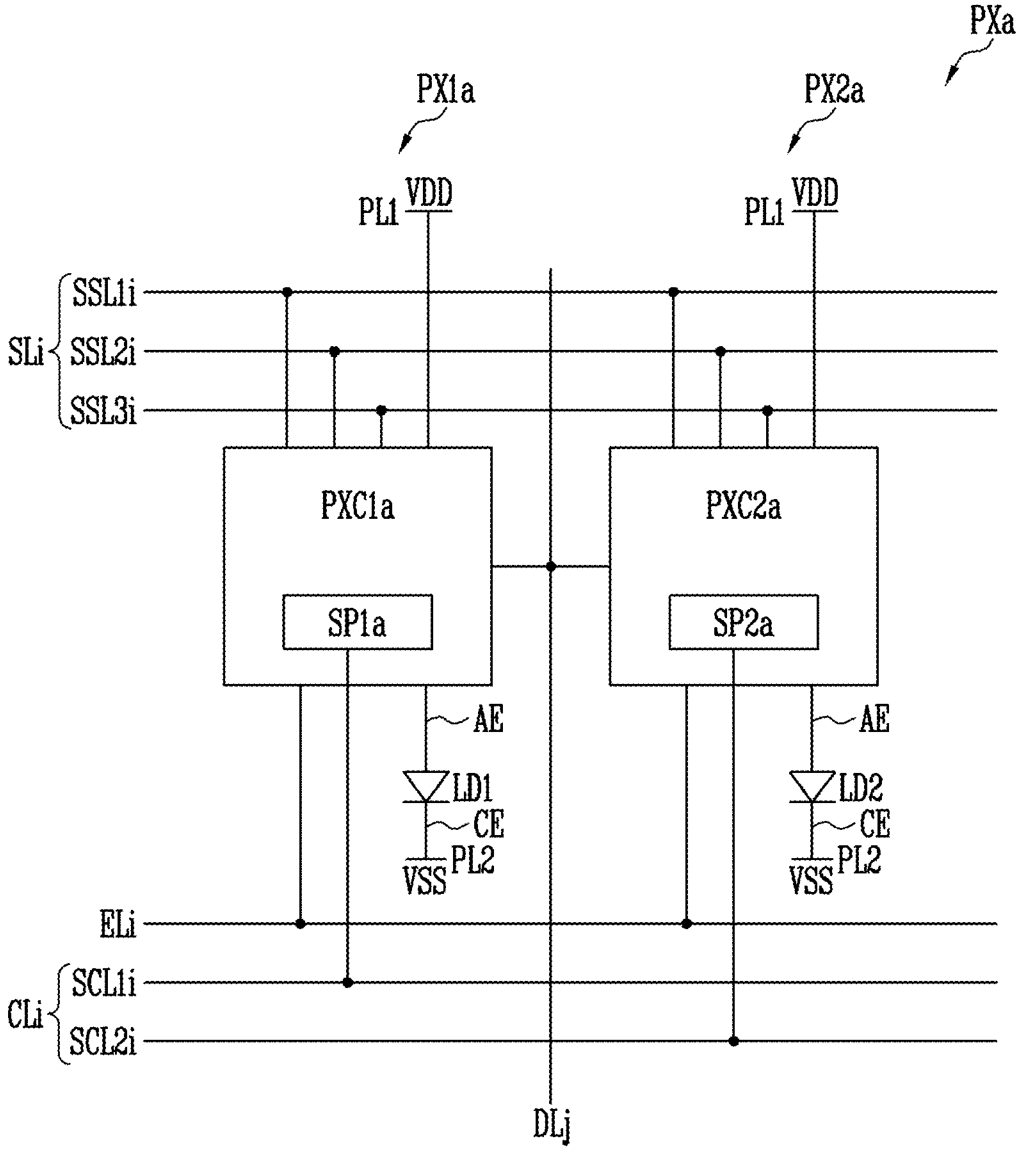
FIG. 8 is a block diagram illustrating an embodiment of the pixels illustrated in FIG. 7.

FIG. 8 is a block diagram illustrating an embodiment of the pixels illustrated in FIG. 7. In FIG. 8, a pixel PXa arranged in the i-th row and the j-th column is illustrated as an example. In describing FIG. 8, a duplicate description of a configuration substantially the same as that in FIG. 2 will be omitted.

Referring to FIG. 8, a pixel PXa according to an embodiment supported by the present disclosure may include a first pixel PX1*a* and a second pixel PX2*a*.

The first pixel PX1*a* and the second pixel PX2*a* may include pixel circuits PXC1*a* and PXC2*a* and light-emitting elements LD1 and LD2, respectively.

The pixel circuits PXC1*a* and PXC2*a* may be connected to an i-th scan line SLi and an i-th emission control line ELi. In some aspects, the first pixel circuit PXC1*a* may be connected to a first sub-control line SCL1*i*, and the second pixel circuit PXC2*a* may be connected to a second sub-control line SCL2*i*.

The pixel circuits PXC1*a* and PXC2*a* may operate in response to a scan signal received through the i-th scan line SLi. The i-th scan line SLi may include a first sub-scan line SSL1*i*, a second sub-scan line SSL2*i*, and a third sub-scan line SSL3*i*. For example, each of the scan lines SL1 to SLn (see FIG. 7) may include three sub-scan lines. The pixel circuits PXC1*a* and PXC2*a* may operate in response to a first scan signal, a second scan signal, and a third scan signal supplied to the first sub-scan line SSL1*i*, the second sub-scan line SSL2*i*, and the third sub-scan line SSL3*i*.

The pixel circuits PXC1*a* and PXC2*a* may operate in response to an emission control signal received through the i-th emission control line ELi. The emission time of the light-emitting element LD1 and LD2 may be determined in response to a supply time of the emission control signal having a gate-off voltage.

The first pixel circuit PXC1*a* may receive a first data signal from the j-th data line DLj during a first period of one horizontal period 1H in response to the first control signal supplied to the first sub-control line SCL1*i*. Here, the first sub-control line SCL1*i* may be any one of the scan lines SL1 to SLn. For example, the first sub-control line SCL1*i* may be the (i+1)-th second sub-scan line SSL2*i*+1 (see FIG. 9). For example, the first sub-control line SCL1*i* may be the i-th third sub-scan line SSL3*i* (see FIG. 12).

The second pixel circuit PXC2*a* may receive a second data signal from the j-th data line DLj during a second period of one horizontal period 1H in response to a second control signal supplied to the second sub-control line SCL2*i*. Here, the second sub-control line SCL2*i* may be any one of the scan lines SL1 to SLn. For example, the second sub-control line SCL2*i* may be the (i+2)-th second sub-scan line SSL2*i*+2 (see FIG. 9). For example, the second sub-control line SCL2*i* may be the (i+1)-th third sub-scan line SSL3*i*+1 (see FIG. 12).

The first pixel circuit PXC1*a* may include a first selection unit SP1*a*, and the first selection unit SP1*a* may electrically connect the driving transistor of the first pixel circuit PXC1*a* and the j-th data line DLj during a first period in response to a first control signal input to the first sub-control line SCL1*i*. In some aspects, the first selection unit SP1*a* may electrically disconnect the driving transistor of the first pixel circuit PXC1*a* and the j-th data line DLj during a second period.

The second pixel circuit PXC2*a* may include a second selection unit SP2*a*, and the second selection unit SP2*a* may electrically connect the driving transistor of the second pixel circuit PXC2*a* and the j-th data line DLj during a second period in response to a second control signal input to the second sub-control line SCL2*i*. In some aspects, the second selection unit SP2*a* may electrically disconnect the driving transistor of the second pixel circuit PXC2*a* and the j-th data line DLj during the first period.

Figure 9:
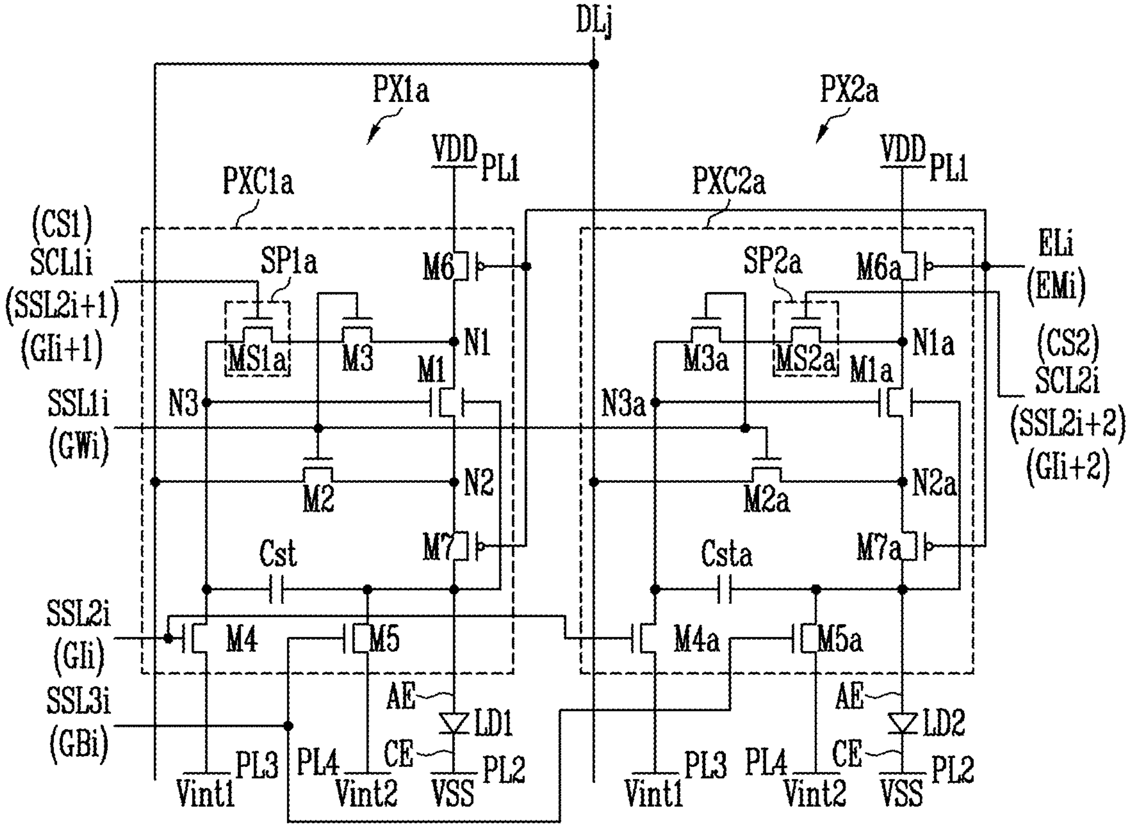
FIG. 9 is a diagram illustrating an embodiment of the pixel circuit illustrated in FIG. 8.

FIG. 9 is a drawing illustrating an embodiment of the pixel circuit illustrated in FIG. 8. In describing FIG. 9, the same drawing reference numerals are assigned to components substantially the same as those in FIG. 4, and duplicate descriptions are omitted.

Referring to FIG. 9, the first pixel circuit PXC1*a* may include a first transistor M1, a second transistor M2, a third transistor M3, a fourth transistor M4, a fifth transistor M5, a sixth transistor M6, a seventh transistor M7, a storage capacitor Cst, and a first selection unit SP1*a*.

The second pixel circuit PXC2*a* may include a first transistor M1*a*, a second transistor M2*a*, a third transistor M3*a*, a fourth transistor M4*a*, a fifth transistor M5*a*, a sixth transistor M6*a*, a seventh transistor M7*a*, a storage capacitor Csta, and a second selection unit SP2*a*.

The first selection unit SP1*a* may be connected between the third transistor M3 and the third node N3. The first selection unit SP1*a* may include a first selection transistor MS1*a* connected between the third transistor M3 and the third node N3 and having a gate electrode connected to the first sub-control line SCL1*i*. The first selection transistor MS1*a* may be formed as an N-type transistor. However, embodiments supported by the present disclosure are not limited thereto, and the first selection transistor MS1*a* may also be connected between the third transistor M3 and the first node N1.

The first sub-control line SCL1*i* may be the second sub-scan line located in the next horizontal line, for example, the (i+1)-th second sub-scan line SSL2*i*+1. In this case, the first control signal CS1 supplied to the first sub-control line CL1*i* may be the (i+1)-th second scan signal GIi+1. The first selection transistor MS1*a* may turn on when the (i+1)-th second scan signal GIi+1 of the gate-on voltage (or the logic high level) is supplied, thereby electrically connecting the third transistor M3 and the third node N3.

The first selection transistor MS1*a* may have a turn-on period that partially overlaps with the third transistor M3 and may be turned off before the third transistor M3. In an example in which the first selection transistor MS1*a* is turned off before the third transistor M3, the kickback voltage due to the turn-off of the third transistor M3 may be prevented from being transmitted to the third node N3.

The second selection unit SP2*a* may be connected between the third transistor M3*a* and the first node N1*a*. The second selection unit SP2*a* may be connected between the third transistor M3*a* and the first node N1*a* and may include a second selection transistor MS2*a* whose gate electrode is connected to the second sub-control line SCL2*i*. The second selection transistor MS2*a* may be formed as an N-type transistor. However, embodiments supported by the present disclosure are not limited thereto, and the second selection transistor MS2*a* may also be connected between the third transistor M3*a* and the third node N3*a*.

The second sub-control line SCL2*i* may be the second sub-scan line located in the next horizontal line, for example, the (i+2)-th second sub-scan line SSL2*i*+2. In this case, the second control signal CS2 supplied to the second sub-control line SCL2*i* may be the (i+2)-th second scan signal GIi+2. The second selection transistor MS2*a* may turn on when the (i+2)-th second scan signal GIi+2 of the gate-on voltage (or the logic high level) is supplied, thereby electrically connecting the third transistor M3*a* and the first node N1*a*.

The second selection transistor MS2*a* may have a turn-on period that partially overlaps with the third transistor M3*a* and may be turned off later than the third transistor M3*a*. In an example in which the second selection transistor MS2*a* is turned off later than the third transistor M3*a*, the kickback voltage due to the turn-off of the second selection transistor MS2*a* may be prevented from being transmitted to the third node N3*a*.

Figure 10:
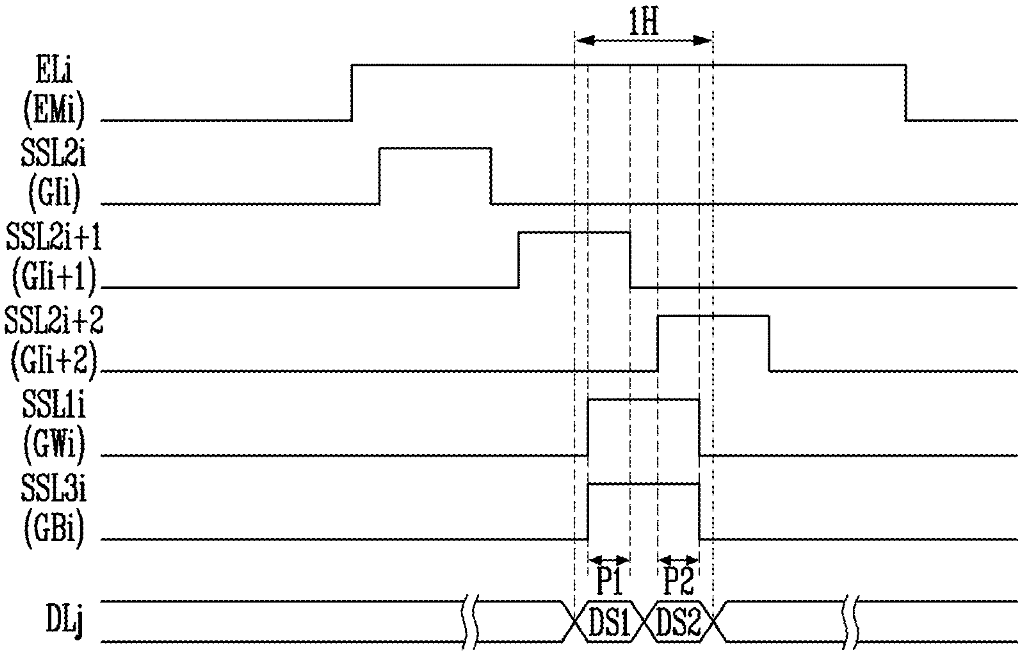
FIG. 10 is a waveform diagram illustrating an embodiment of the operation process of the pixel illustrated in FIG. 9.

FIG. 10 is a waveform diagram illustrating an example of the operation process of the pixel illustrated in FIG. 9.

Referring to FIG. 10, the gate driver 120 (see FIG. 1) may sequentially supply the second scan signals GIi, GIi+1, and GIi+2 of the gate-on voltage (that is, logic high level) to the second sub-scan lines SSL2*i*, SSL2*i*+1, and SSL2*i*+2 such that they do not overlap each other.

In some aspects, the gate driver 120 may supply the first scan signal GWi to the first sub-scan line SSL1*i* such that the first scan signal GWi overlaps with each of the (i+1)-th second scan signal GIi+1 and the (i+2)-th second scan signal GIi+2 for a partial period of time. In some aspects, the gate driver 120 may supply the third scan signal GBi to the third sub-scan line SSL3*i* such that the third scan signal GBi overlaps with the first scan signal GWi. In an example in which the third scan signal GBi is supplied such that the third scan signal GBi overlaps with the first scan signal GWi, the third sub-scan line SSL3*i* may be replaced with the first sub-scan line SSL1*i*, and in this case, the third sub-scan line SSL3*i* may be removed. The emission driver 160 (see FIG. 1) may supply an emission control signal EMi of a logic high level to the emission control line ELi such that the emission control signal EMi overlaps with the second scan signals GIi, GIi+1, and GIi+2.

Here, a period during which the (i+1)-th second scan signal GIi+1 of a logic high level and the first scan signal GWi of a logic high level overlap may be set as a first period P1, and a period during which the (i+2)-th second scan signal GIi+2 of a logic high level and the first scan signal GWi overlap may be set as a second period P2.

The data driver 130 (see FIG. 1) may supply a first data signal DS1 corresponding to the first pixel PX1*a* to the data line DLj during the first period P1, and supply a second data signal DS2 corresponding to the second pixel PX2*a* to the data line DLj during the second period P2. The first data signal DS1 may be supplied to the first pixel PX1*a*, and the second data signal DS2 may be supplied to the second pixel PX2*a*.

That is, the data driver 130 sequentially supplies the first data signal DS1 and the second data signal DS2 to the data line DLj for one horizontal period 1H, and the first data signal DS1 and the second data signal DS2 may be supplied to the first pixel PX1*a* and the second pixel PX2*a*, respectively. In this embodiment of the present disclosure, a separate demultiplexer is not included, and one data line DLj may be shared by adjacent pixels PX1*a* and PX2*a*.

FIGS. 11A to 11D are drawings illustrating the operation process of a pixel corresponding to the driving method of FIG. 10.

Figure 11A:
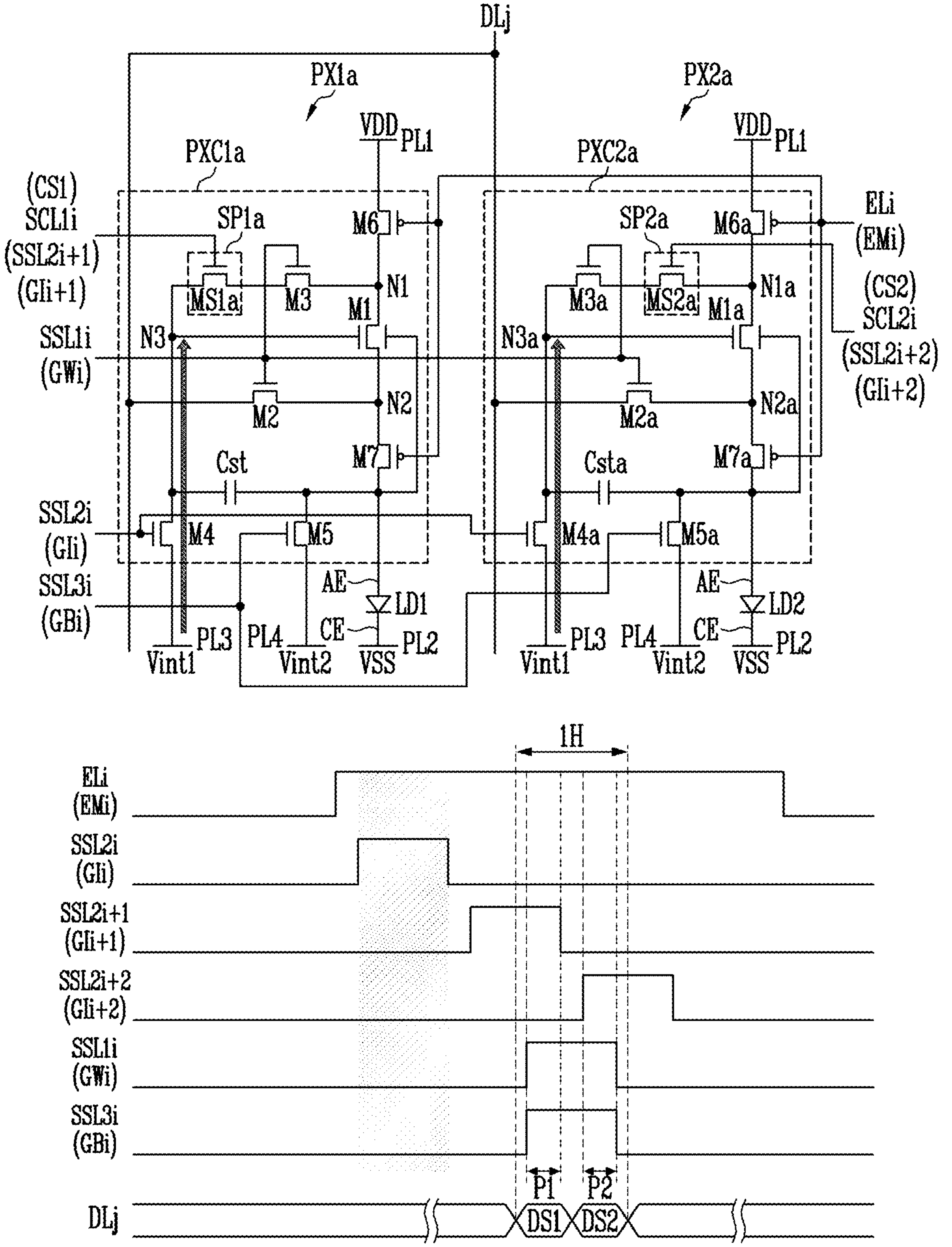
FIGS. 11A to 11D are diagrams illustrating an embodiment of the operation process of the pixel corresponding to the driving method of FIG. 10.

Referring to FIG. 11A, first, the i-th emission control signal EMi of the logic high level is supplied to the i-th emission control line ELi. In an example in which the i-th emission control signal EMi of the logic high level is supplied, the sixth transistor M6 and M6*a* and the seventh transistor M7 and M7*a* are turned off. In an example in which the sixth transistor M6 and M6*a* and the seventh transistor M7 and M7*a* are turned off, the pixels PX1*a* and PX2*a* are set to a non-emission state.

Thereafter, the i-th second scan signal GIi of the gate-on voltage (or logic high level) may be supplied to the i-th second sub-scan line SSL2*i*. In an example in which the i-th second scan signal GIi of the gate-on voltage is supplied, the fourth transistors M4 and M4*a* are turned on. In an example in which the fourth transistors M4 and M4*a* are turned on, the first initialization voltage Vint1 is supplied to the third nodes N3 and N3*a*, and accordingly, the third nodes N3 and N3*a* may be initialized with the first initialization voltage Vint1.

Figure 11B:
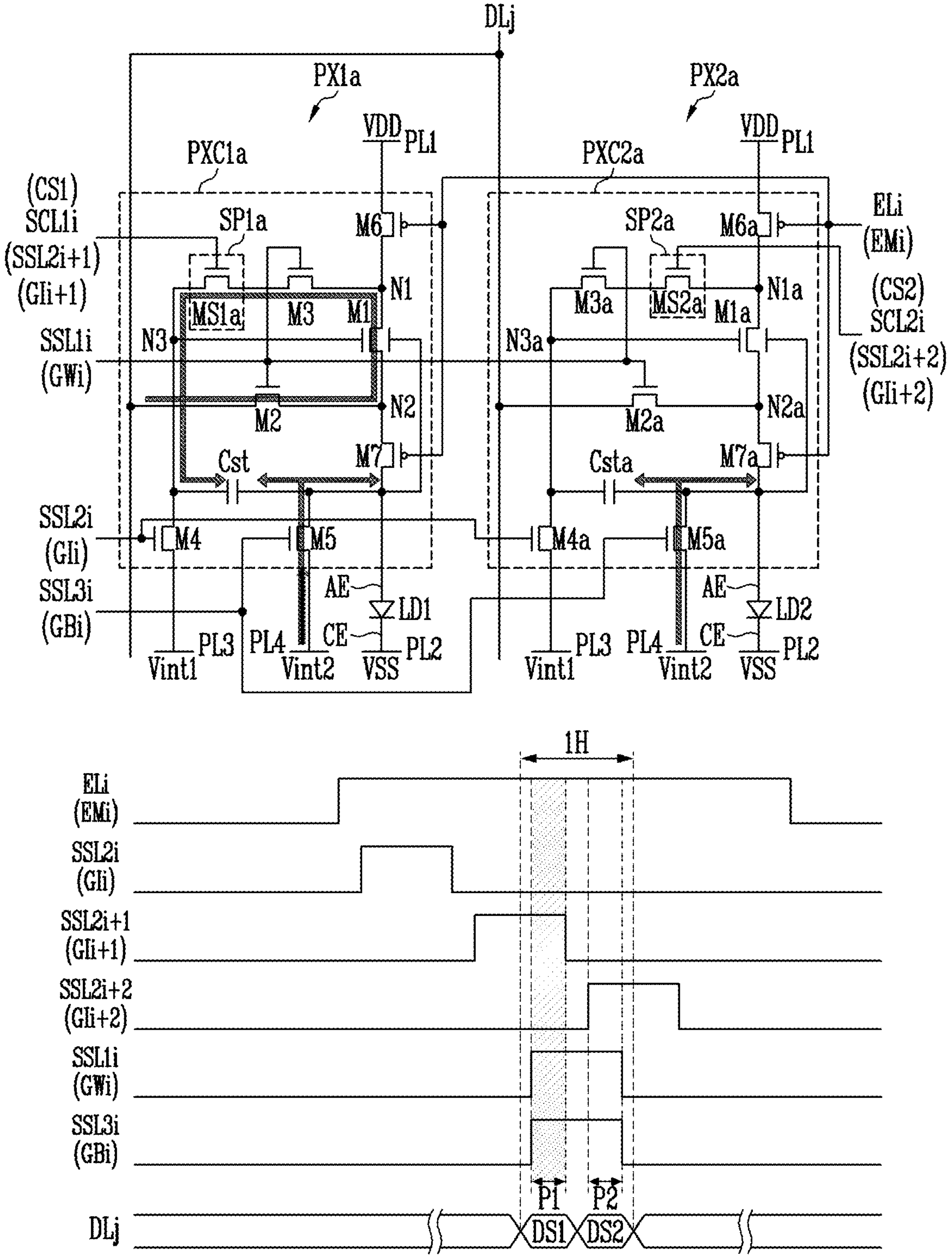

Referring to FIG. 11B, the (i+1)-th second scan signal GIi+1 of the gate-on voltage may be supplied to the (i+1)-th second sub-scan line SSL2*i*+1. Then, the first scan signal GWi of the gate-on voltage (or the logic high level) may be supplied to the first sub-scan line SSL1*i* such that the first scan signal GWi overlaps with the (i+1)-th second scan signal GIi+1 for a portion of a period (or the first period P1), and the third scan signal GBi of the gate-on voltage (or the logic high level) may be supplied to the third sub-scan line SSL3*i*.

When the (i+1)-th second scan signal GIi+1 is supplied to the (i+1)-th second sub-scan line SSL2*i*+1, the first selection transistor MS1*a* is turned on. In an example in which the first scan signal GWi is supplied to the first sub-scan line SSL1*i*, the second transistors M2 and M2*a* and the third transistors M3 and M3*a* are turned on.

In this case, the first data signal DS1 supplied to the data line DLj during the first period P1 may be supplied to the third node N3 via the second node N2 and the first transistor M1 connected in a diode form. At this time, a voltage compensated for the threshold voltage of the first transistor M1 is applied to the third node N3 by the first transistor M1 connected in a diode form. The storage capacitor Cst stores the voltage of the third node N3.

In some embodiments, during the first period P1, the second selection transistor MS2*a* is maintained in a turn-off state in response to the gate-off voltage (or logic low level voltage) supplied to the (i+2)-th second sub-scan line SSL2*i*+2. In an example in which the second selection transistor MS2*a* is turned off, the first data signal DS1 from the data line DLj is not supplied to the third node N3*a* of the second pixel PX2*a*.

When the third scan signal GBi of the gate-on voltage is supplied to the third sub-scan line SSL3*i*, the fifth transistors M5 and M5*a* may turn on. In an example in which the fifth transistors M5 and M5*a* are turned on, the second initialization voltage Vint2 may be supplied to the anode electrode AE of the light-emitting element LD1 and LD2, and thus the black expression capability may be improved.

Figure 11C:
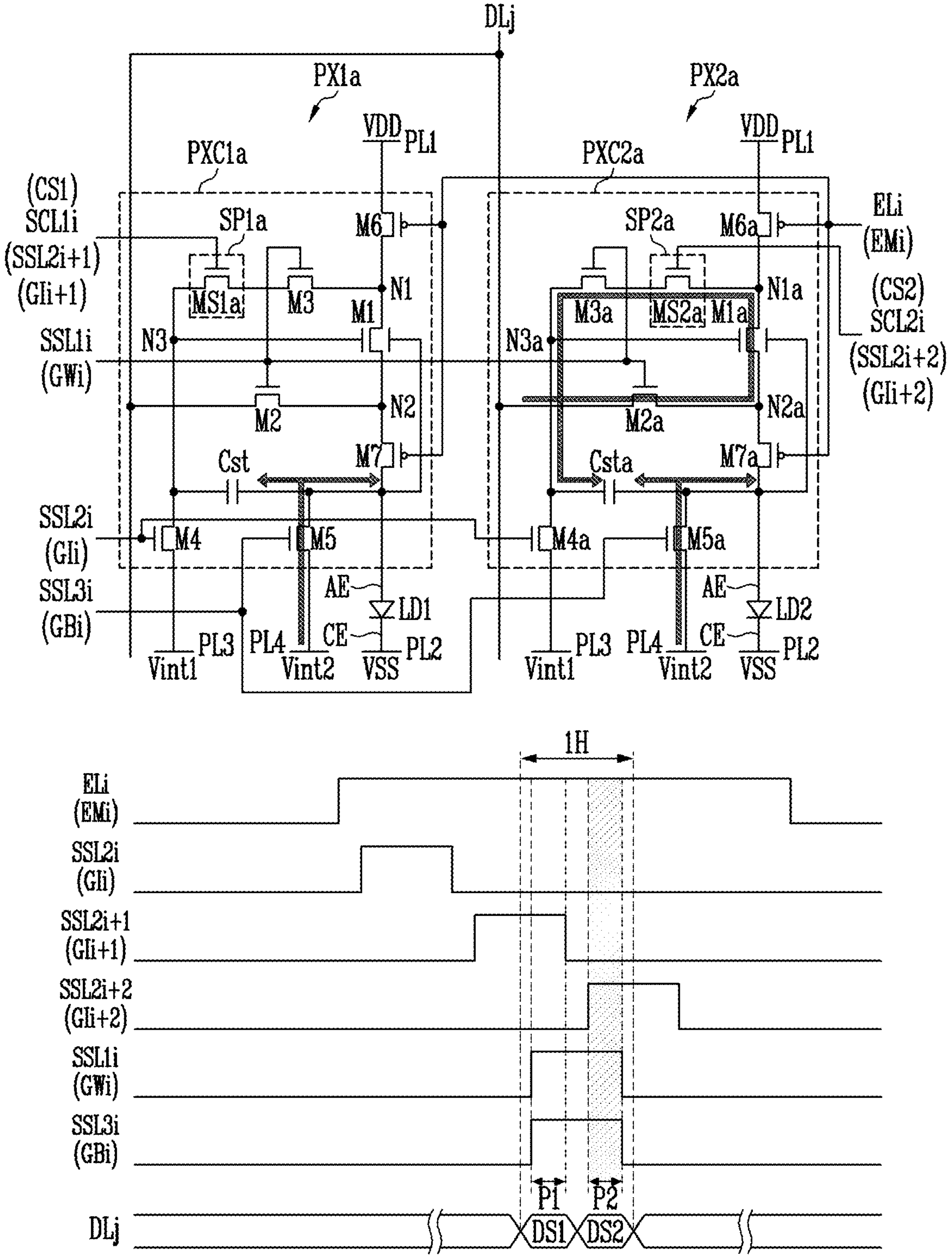

Referring to FIG. 11C, during a period including the second period P2, the (i+2)-th second scan signal GIi+2 of the gate-on voltage may be supplied to the (i+2)-th second sub-scan line SSL2*i*+2. In an example in which the (i+2)-th second scan signal GIi+2 is supplied to the (i+2)-th second sub-scan line SSL2*i*+2, the second selection transistor MS2*a* is turned on.

Then, the second data signal DS2 supplied to the data line DLj may be supplied to the third node N3*a* via the second node N2*a* and the first transistor M1*a* connected in a diode form. At this time, a voltage compensated for the threshold voltage of the first transistor M1*a* is applied to the third node N3*a* by the first transistor M1*a* connected in a diode form. The storage capacitor Csta stores the voltage of the third node N3*a*.

In some embodiments, during the second period P2, the first selection transistor MS1*a* is maintained in a turn-off state in response to the gate-off voltage (or logic low level voltage) supplied to the i+1 second sub-scan line SSL2*i*+1. In an example in which the first selection transistor MS1*a* is turned off, the second data signal DS2 from the data line DLj is not supplied to the third node N3 of the first pixel PX1*a*. In this case, the first pixel PX1*a* may maintain the voltage of the first data signal DS1.

Figure 11D:
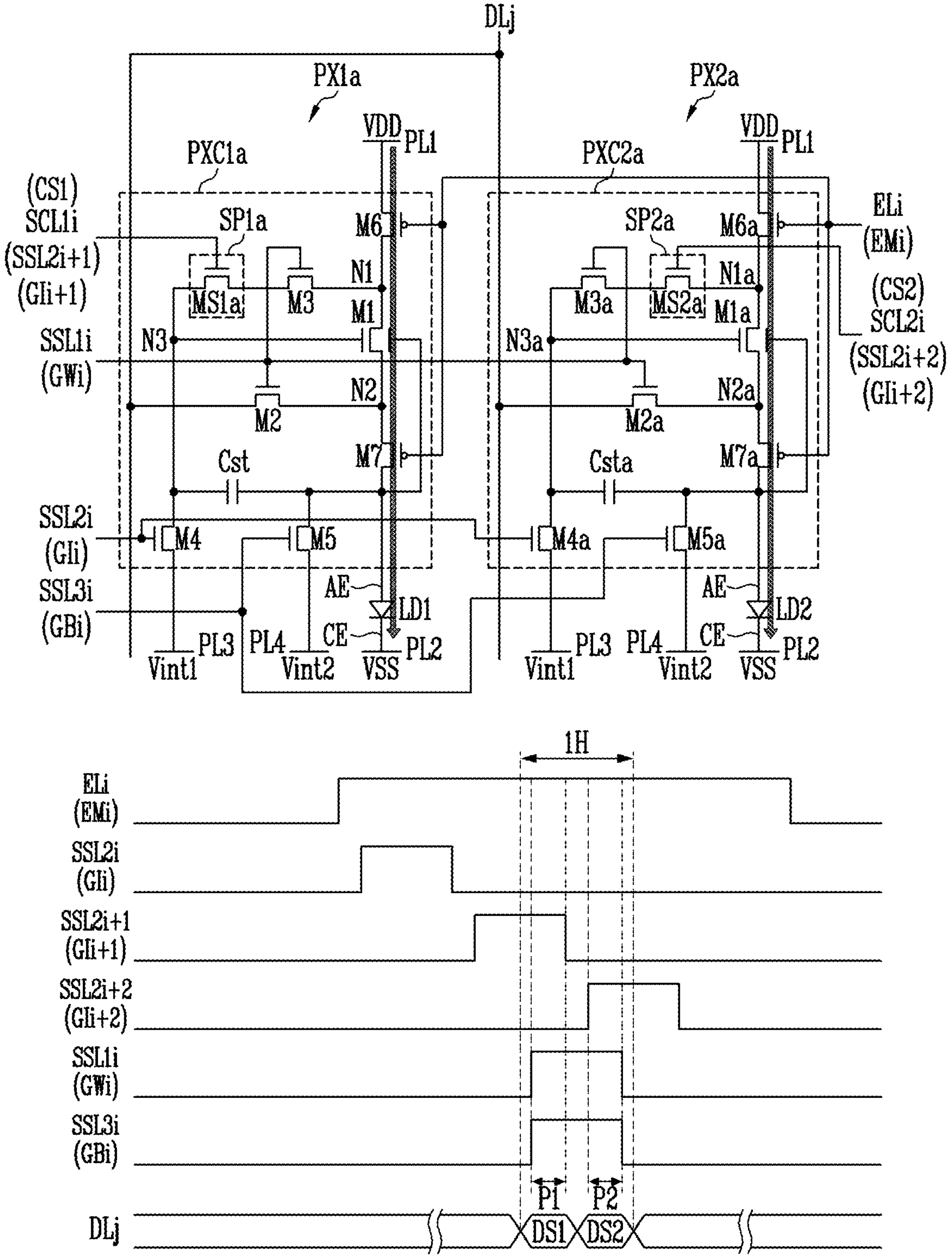

Referring to FIG. 11D, after the voltage of the data signal DS1 and DS2 is stored in the first pixel PX1*a* and the second pixel PX2*a*, the emission control signal EMi of the logic low level is supplied to the i-th emission control line ELi. In an example in which the emission control signal EMi of the logic low level is supplied to the i-th emission control line ELi, the sixth transistor M6 and M6*a* and the seventh transistor M7 and M7*a* are turned on.

The first transistor M1 may supply a predetermined driving current from the first power line PL1 to the second power line PL2 via the first light-emitting element LD1 in response to the voltage of the third node N3, and accordingly, the first light-emitting element LD1 may generate light having a brightness corresponding to the first data signal DS1.

The first transistor M1*a* may supply a predetermined driving current from the first power line PL1 to the second power line PL2 via the second light-emitting element LD2 in response to the voltage of the third node N3*a*, and accordingly, the second light-emitting element LD2 may generate light having a brightness corresponding to the second data signal DS2.

Figure 12:
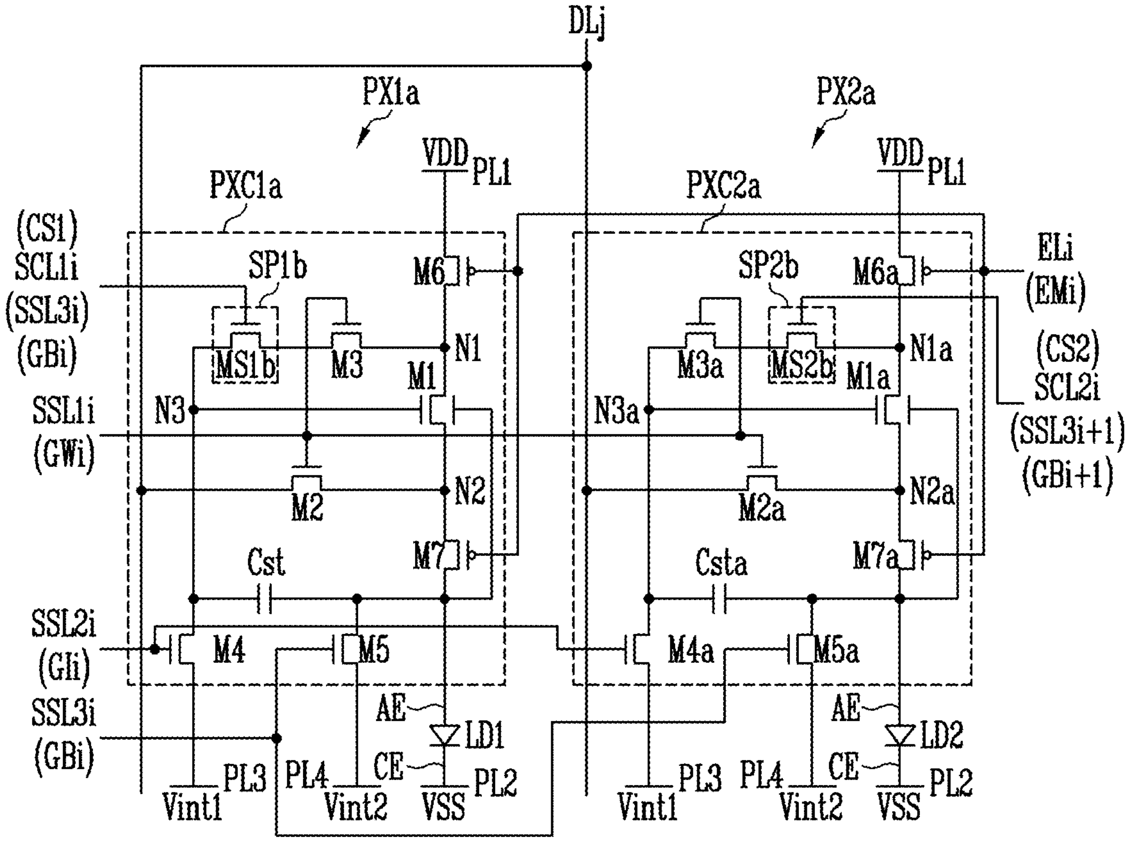
FIG. 12 is a diagram illustrating an embodiment of the pixel circuit illustrated in FIG. 8.

FIG. 12 is a drawing illustrating an embodiment of the pixel circuit illustrated in FIG. 8. In describing FIG. 12, the same reference numerals are assigned to the same components as those in FIG. 9, and duplicate descriptions are omitted.

Referring to FIG. 12, the first pixel circuit PXC1*a* may include a first transistor M1, a second transistor M2, a third transistor M3, a fourth transistor M4, a fifth transistor M5, a sixth transistor M6, a seventh transistor M7, a storage capacitor Cst, and a first selection unit SP1*b*.

The second pixel circuit PXC2*a* may include a first transistor M1*a*, a second transistor M2*a*, a third transistor M3*a*, a fourth transistor M4*a*, a fifth transistor M5*a*, a sixth transistor M6*a*, a seventh transistor M7*a*, a storage capacitor Csta, and a second selection unit SP2*b*.

The first selection unit SP1*b* may be connected between the third transistor M3 and the third node N3. The first selection unit SP1*b* may be connected between the third transistor M3 and the third node N3 and may include a first selection transistor MS1*b* whose gate electrode is connected to the first sub-control line SCL1*i*. The first selection transistor MS1*b* may be formed as an N-type transistor. However, embodiments supported by the present disclosure are not limited thereto, and the first selection transistor MS1*b* may be connected between the third transistor M3 and the first node N1.

The first sub-control line SCL1*i* may be the i-th third sub-scan line SSL3*i* positioned in the current horizontal line. In this case, the first control signal CS1 supplied to the first sub-control line SCL1*i* may be the i-th third scan signal GBi. The first selection transistor MS1*b* may turn on when the i-th third scan signal GBi of the gate-on voltage (or logic high level) is supplied, and may electrically connect the third transistor M3 and the third node N3.

The first selection transistor MS1*b* may have a turn-on period that partially overlaps with the third transistor M3, and may be turned off before the third transistor M3. In an example in which the first selection transistor MS1*b* is turned off before the third transistor M3, the kickback voltage due to the turn-off of the third transistor M3 may be prevented from being transmitted to the third node N3.

The second selection unit SP2*b* may be connected between the third transistor M3*a* and the first node N1*a*. The second selection unit SP2*b* may include a second selection transistor MS2*b* connected between the third transistor M3*a* and the first node N1*a* and having a gate electrode connected to the second sub-control line SCL2*i*. The second selection transistor MS2*b* may be formed as an N-type transistor. However, embodiments supported by the present disclosure are not limited thereto, and the second selection transistor MS2*b* may also be connected between the third transistor M3*a* and the third node N3*a*.

The second sub-control line SCL2*i* may be the third sub-scan line located in the next horizontal line, for example, the (i+1)-th third sub-scan line SSL3*i*+1. In this case, the second control signal CS2 supplied to the second sub-control line SCL2*i* may be the (i+1)-th third scan signal GBi+1. The second selection transistor MS2*b* may turn on when the (i+1)-th third scan signal GBi+1 of the gate-on voltage (or logic high level) is supplied, thereby electrically connecting the third transistor M3*a* and the first node N1*a*.

The second selection transistor MS2*b* may have a turn-on period that partially overlaps with the third transistor M3*a* and may be turned off later than the third transistor M3*a*. In an example in which the second selection transistor MS2*b* is turned off later than the third transistor M3*a*, the kickback voltage due to the turn-off of the second selection transistor MS2*b* may be prevented from being transmitted to the third node N3*a*.

Figure 13:
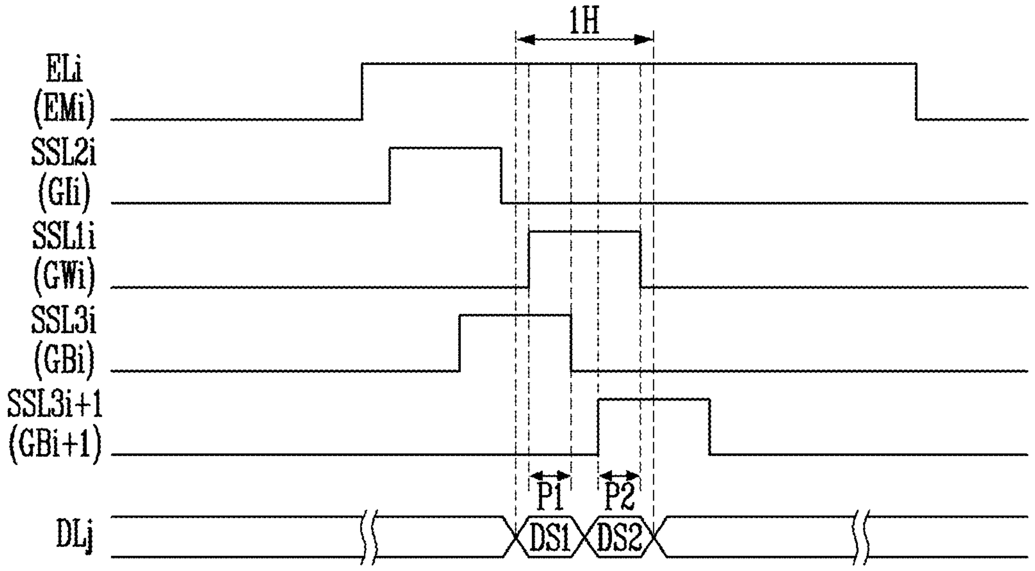
FIG. 13 is a waveform diagram illustrating an embodiment of the operation process of the pixel illustrated in FIG. 12.

FIG. 13 is a waveform diagram illustrating an example of the operation process of the pixel illustrated in FIG. 12.

Referring to FIG. 13, the gate driver 120 (see FIG. 1) may supply a second scan signal GIi of a gate-on voltage (or a logic high level) to the second sub-scan line SSL2*i* and supply a first scan signal GWi to the first sub-scan line SSL1*i* such that the first scan signal GWi does not overlap with the second scan signal GIi.

The gate driver 120 may supply the i-th third scan signal GBi of the gate-on voltage (or logic high level) to the i-th third sub-scan line SSL3*i* such that the i-th third scan signal GBi overlaps with the first scan signal GWi for a certain period of time. Here, the certain period of time during which the first scan signal GWi and the i-th third scan signal GBi overlap may be a first period P1.

The gate driver 120 may supply the (i+1)-th third scan signal GBi+1 of the gate-on voltage (or logic high level) to the (i+1)-th third sub-scan line SSL3*i*+1 such that the (i+1)-th third scan signal GBi+1 overlaps with the first scan signal GWi for the remaining period of time. Here, the remaining period of time during which the first scan signal GWi and the (i+1)-th third scan signal GBi+1 overlap may be a second period P2.

The emission driver 160 (see FIG. 1) may supply an emission control signal EMi of a logic high level to the emission control line ELi such that the emission control signal EMi overlaps with the scan signals GIi, GWi, GBi, and GBi+1.

The data driver 130 (see FIG. 1) may supply a first data signal DS1 corresponding to the first pixel PX1*a* to the data line DLj during the first period P1, and may supply a second data signal DS2 corresponding to the second pixel PX2*a* to the data line DLj during the second period P2. The first data signal DS1 may be supplied to the first pixel PX1*a*, and the second data signal DS2 may be supplied to the second pixel PX2*a*.

FIGS. 14A to 14D are drawings illustrating the operation process of a pixel corresponding to the driving method of FIG. 13.

Figure 14A:
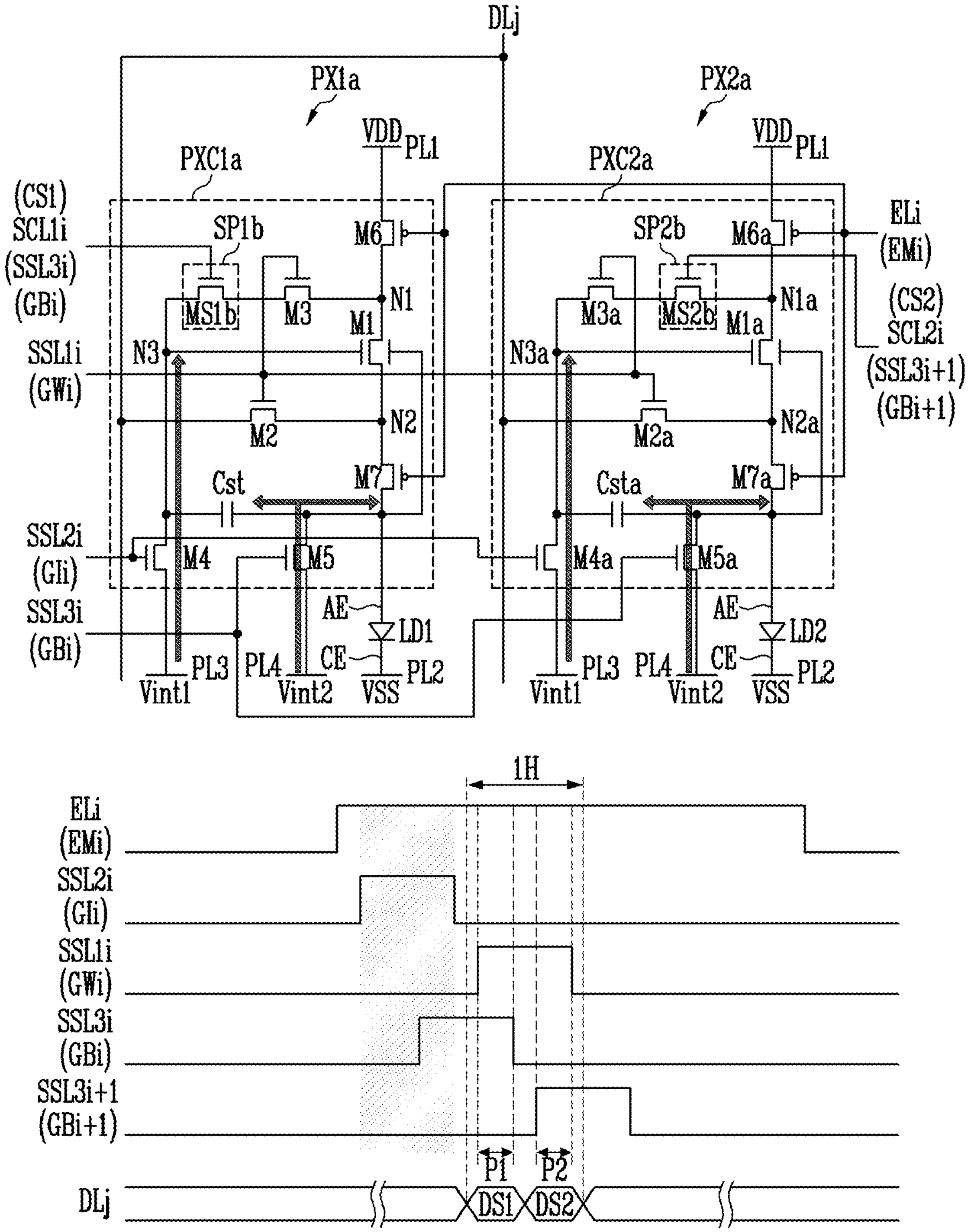
FIGS. 14A to 14D are diagrams illustrating an embodiment of the operation process of the pixel corresponding to the driving method of FIG. 13.

Referring to FIG. 14A, first, an i-th emission control signal EMi of a logic high level is supplied to an i-th emission control line ELi. In an example in which the i-th emission control signal EMi of a logic high level is supplied, the sixth transistor M6 and M6*a* and the seventh transistor M7 and M7*a* are turned off. In an example in which the sixth transistor M6 and M6*a* and the seventh transistor M7 and M7*a* are turned off, the pixels PX1*a* and PX2*a* are set to a non-emission state.

Thereafter, a second scan signal GIi of a gate-on voltage (or a logic high level) may be supplied to a second sub-scan line SSL2*i*. In an example in which the second scan signal GIi of a gate-on voltage is supplied, the fourth transistors M4 and M4*a* are turned on. In an example in which the fourth transistors M4 and M4*a* are turned on, the first initialization voltage Vint1 is supplied to the third nodes N3 and N3*a*, and accordingly, the third nodes N3 and N3*a* may be initialized to the first initialization voltage Vint1.

Then, the i-th third scan signal GBi is supplied to the i-th third sub-scan line SSL3*i*, and accordingly, the fifth transistors M5 and M5*a* are turned on. In an example in which the fifth transistors M5 and M5*a* are turned on, the second initialization voltage Vint2 is supplied to the anode electrode AE of the light-emitting element LD1 and LD2, and accordingly, the anode electrode AE of the light-emitting element LD1 and LD2 may be initialized to the second initialization voltage Vint2.

Then, the first selection transistor MS1*b* may turn on based on the i-th third scan signal GBi. At this time, since the third transistor M3 is set to a turn-off state, no voltage is supplied to the third node N3.

Figure 14B:
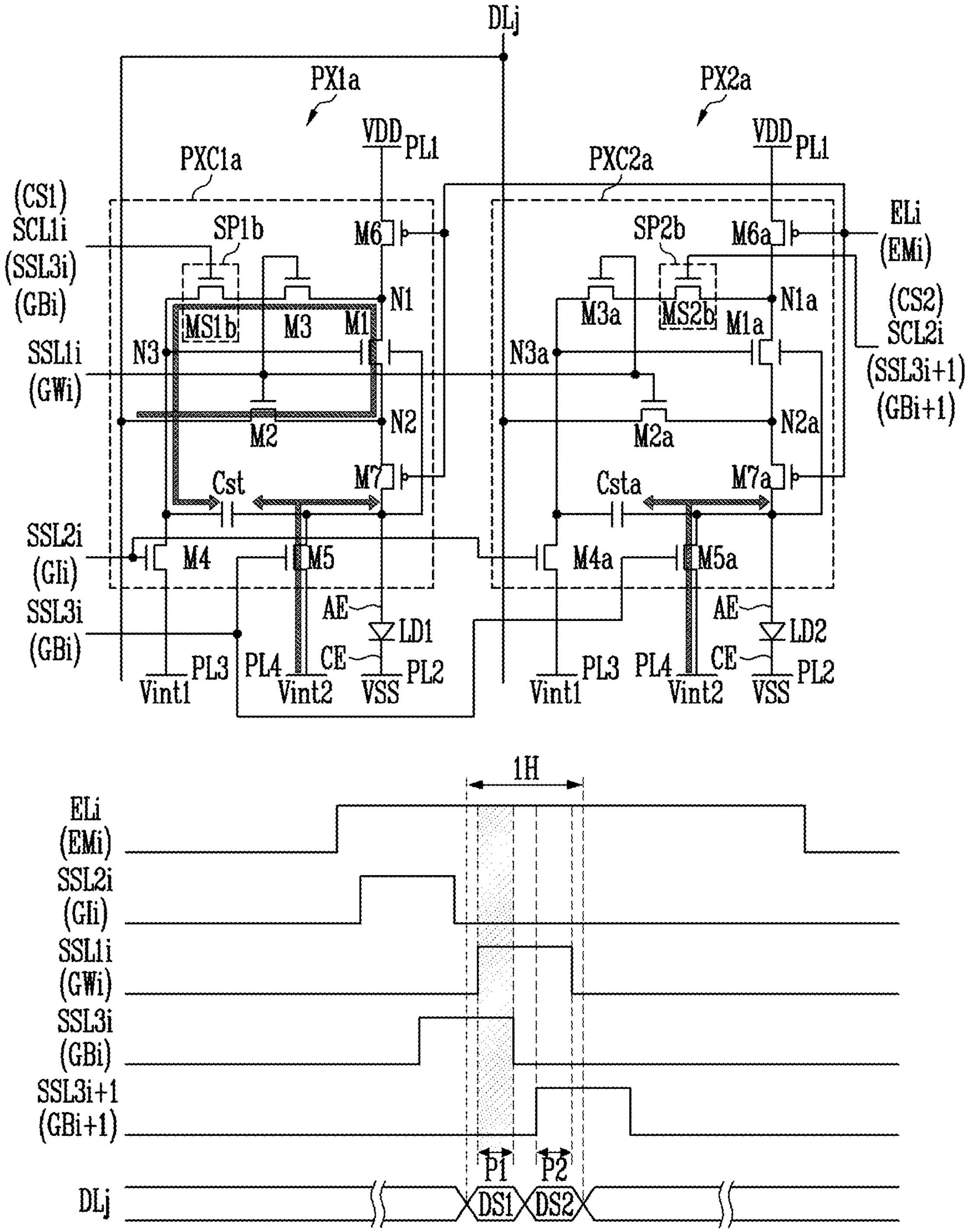

Referring to FIG. 14B, the first scan signal GWi of the gate-on voltage may be supplied to the first sub-scan line SSL1*i* such that the first scan signal GWi overlaps with the i-th third scan signal GBi for a certain period of time. Here, the certain period of time during which the i-th third scan signal GBi and the first scan signal GWi overlap may be a first period P1.

When the first scan signal GWi is supplied to the first sub-scan line SSL1*i*, the second transistors M2 and M2*a* and the third transistors M3 and M3*a* are turned on. Then, the first data signal DS1 supplied to the data line DLj during the first period P1 may be supplied to the third node N3 via the second node N2 and the first transistor M1 connected in a diode form. At this time, a voltage compensated for the threshold voltage of the first transistor M1 is applied to the third node N3 by the first transistor M1 connected in a diode form. The storage capacitor Cst stores the voltage of the third node N3.

In some embodiments, the second selection transistor MS2*b* maintains a turn-off state in response to the gate-off voltage supplied to the (i+1)-th third sub-scan line SSL3*i*+1 during the first period P1. In an example in which the second selection transistor MS2*b* is turned off, the first data signal DS1 from the data line DLj is not supplied to the third node N3*a* of the second pixel PX2*a*.

Figure 14C:
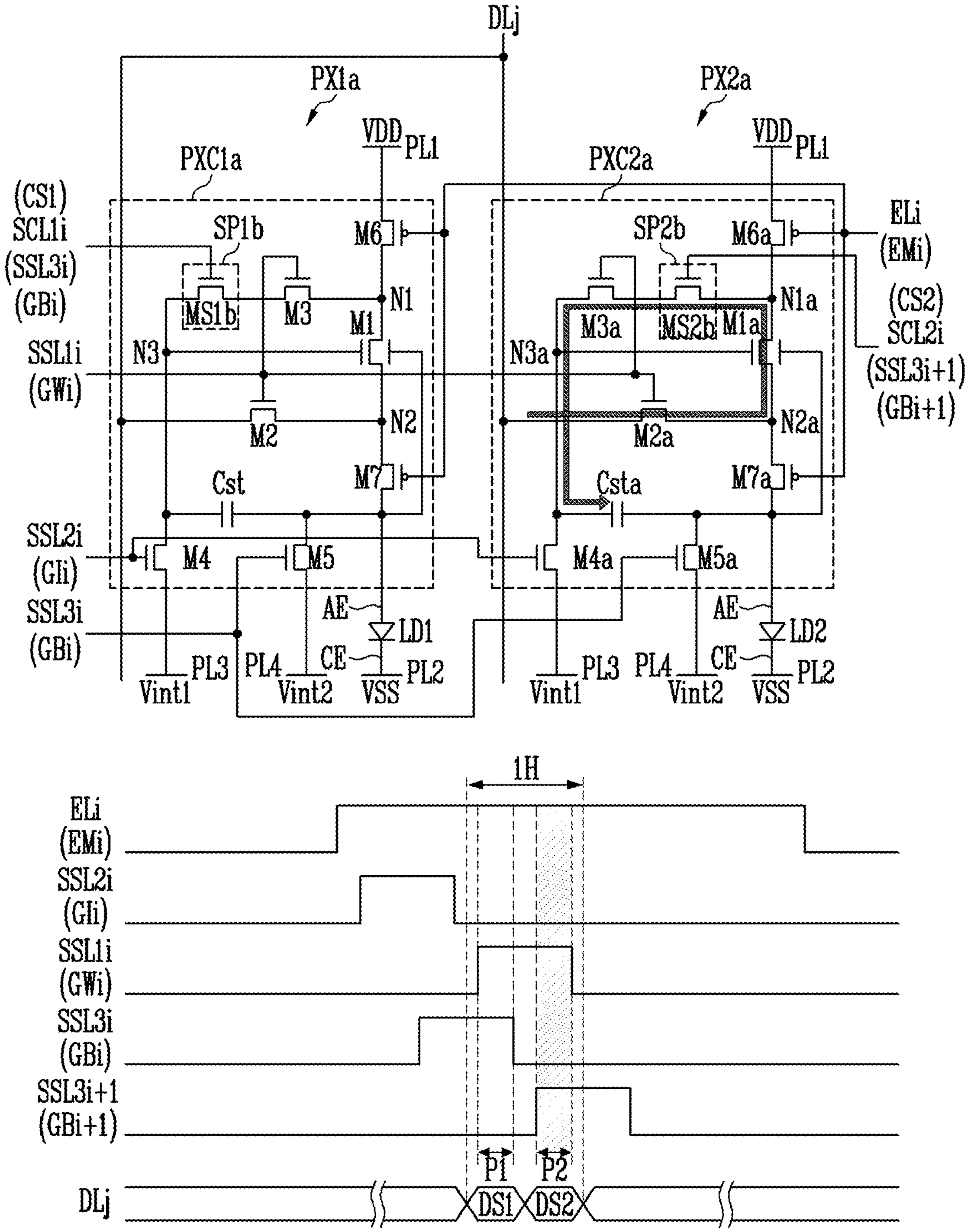

Referring to FIG. 14C, the (i+1)-th third scan signal GBi+1 of the gate-on voltage may be supplied to the (i+1)-th third sub-scan line SSL3*i*+1 such that the (i+1)-th third scan signal GBi+1 overlaps with the first scan signal GWi during the remaining period. Here, the period during which the i+1 th third scan signal GBi+1 and the first scan signal GWi overlap may be the second period P2. In an example in which the i+1 th third scan signal GBi+1 of the gate-on voltage is supplied to the i+1 th third sub-scan line SSL3*i*+1, the second selection transistor MS2*b* is turned on.

Then, the second data signal DS2 supplied to the data line DLj may be supplied to the third node N3*a* via the second node N2*a* and the first transistor M1*a* connected in a diode form. At this time, a voltage compensated for the threshold voltage of the first transistor M1*a* is applied to the third node N3*a* by the first transistor M1*a* connected in a diode form. The storage capacitor Csta stores the voltage of the third node N3*a*.

In some embodiments, during the second period P2, the first selection transistor MS1*b* is maintained in a turn-off state in response to the gate-off voltage supplied to the i-th third sub-scan line SSL3*i*. In an example in which the first selection transistor MS1*b* is turned off, the second data signal DS2 from the data line DLj is not supplied to the third node N3 of the first pixel PX1*a*.

Figure 14D:
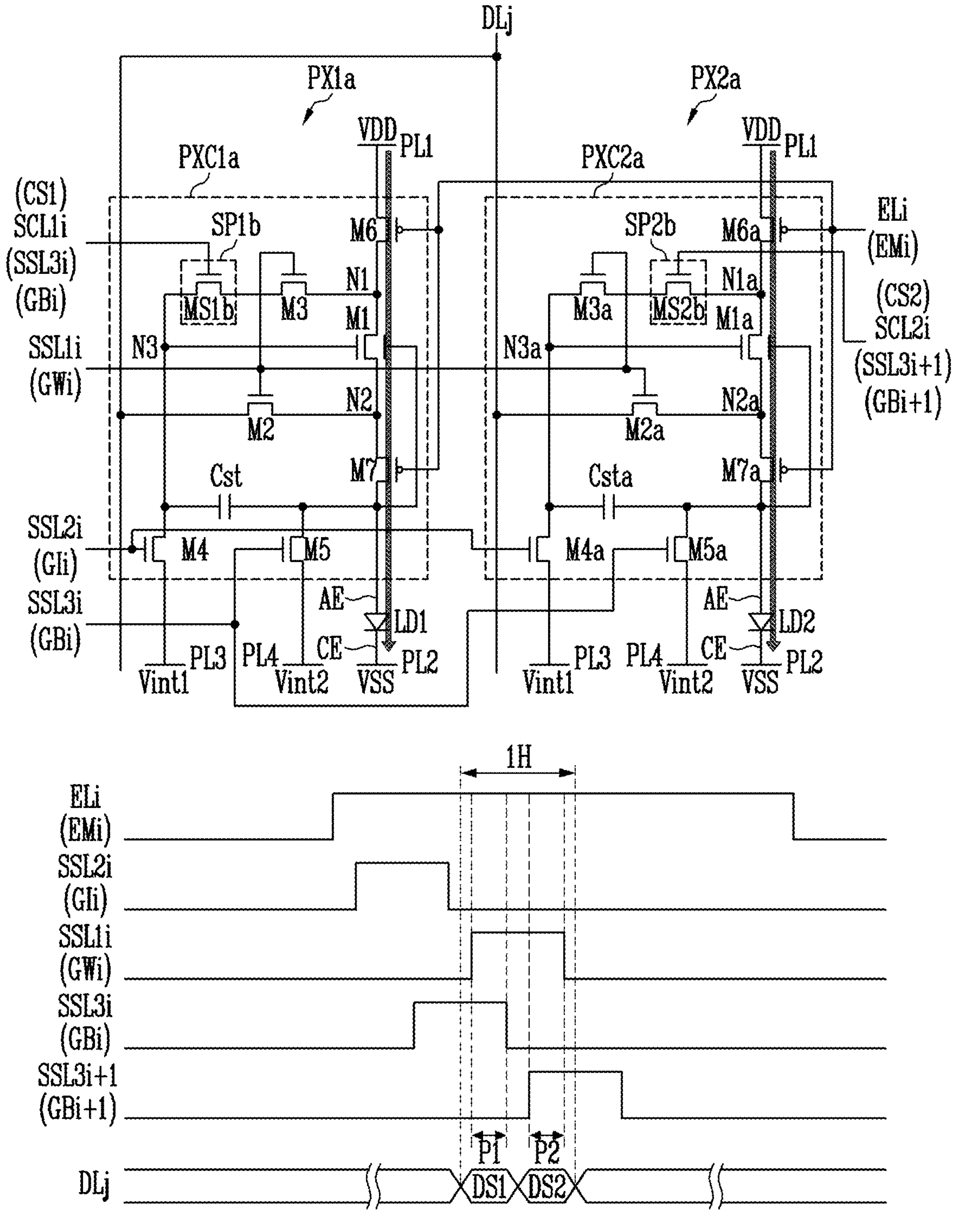

Referring to FIG. 14D, after the voltage of the data signal DS1 and DS2 is stored in the first pixel PX1*a* and the second pixel PX2*a*, an emission control signal EMi of a logic low level is supplied to the i-th emission control line ELi. In an example in which the emission control signal EMi of the logic low level is supplied to the i-th emission control line ELi, the sixth transistor M6 and M6*a* and the seventh transistor M7 and M7*a* are turned on.

The first transistor M1 may supply a predetermined driving current from the first power line PL1 to the second power line PL2 via the first light-emitting element LD1 in response to the voltage of the third node N3, and accordingly, the first light-emitting element LD1 may generate light having a brightness corresponding to the first data signal DS1.

The first transistor M1*a* may supply a predetermined driving current from the first power line PL1 to the second power line PL2 via the second light-emitting element LD2 in response to the voltage of the third node N3*a*, and accordingly, the second light-emitting element LD2 may generate light having a brightness corresponding to the second data signal DS2.

Figure 15:
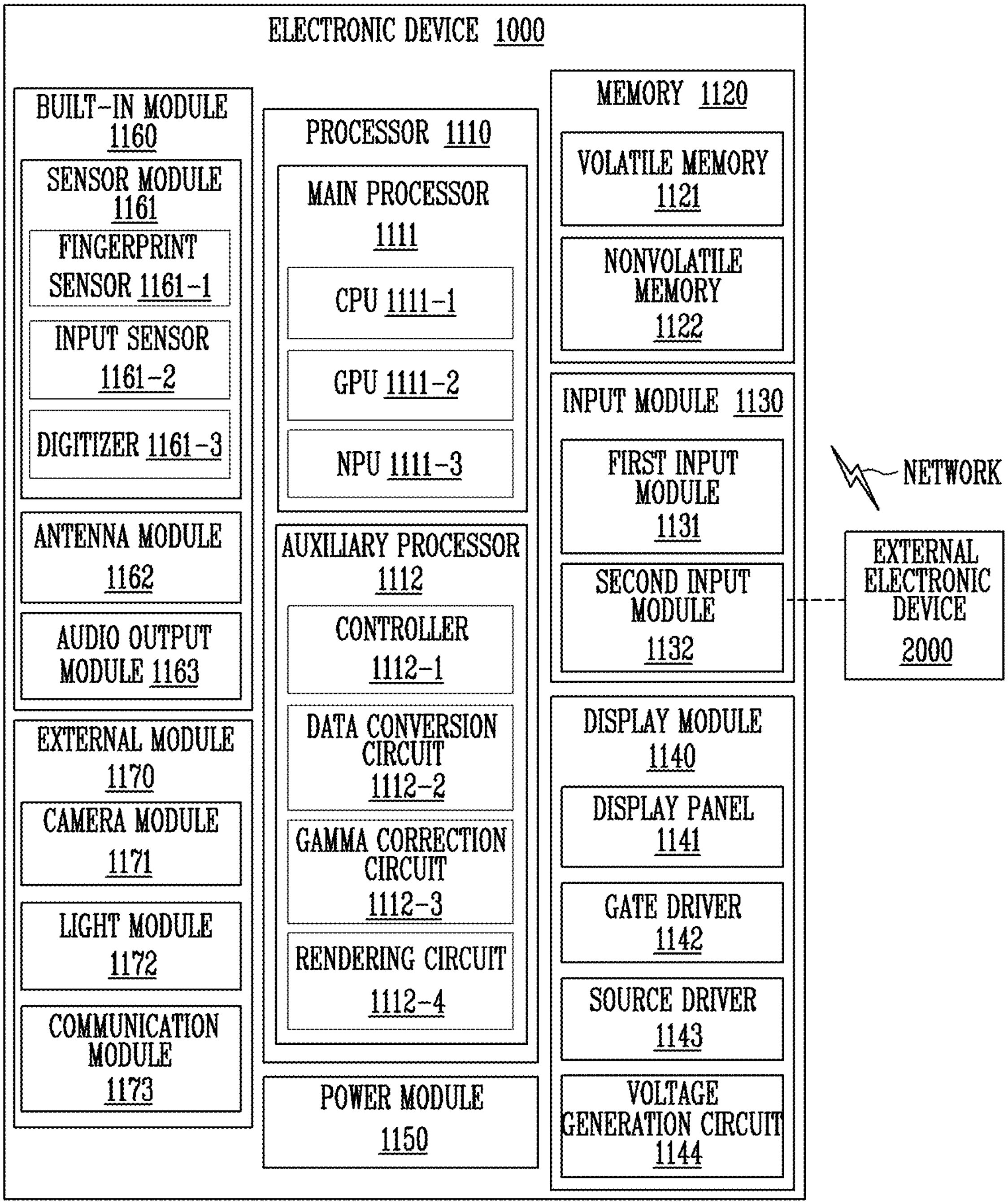
FIG. 15 is a drawing illustrating an electronic device according to an embodiment supported by the present disclosure.

FIG. 15 is a drawing illustrating an electronic device according to an embodiment supported by the present disclosure.

Referring to FIG. 15, an electronic device 1000 according to an embodiment supported by the present disclosure outputs various pieces of information through the display module 1140. In an example in which the processor 1110 executes an application stored in a memory 1120, a display module 1140 provides application information to the user through a display panel 1141.

The processor 1110 obtains external input through an input module 1130 or a sensor module 1161 and executes an application corresponding to the external input. In an example in which the user selects a camera icon (or a camera application icon) displayed in the display panel 1141, the processor 1110 obtains user input through an input sensor 1161-2 and activates a camera module 1171. The processor 1110 transmits image data corresponding to the captured image acquired through the camera module 1171 to the display module 1140. The display module 1140 may display an image corresponding to the captured image through the display panel 1141.

In another example, when personal information authentication is executed in the display module 1140, a fingerprint sensor 1161-1 acquires the input fingerprint information as input data. The processor 1110 compares the input data acquired through the fingerprint sensor 1161-1 with the authentication data stored in the memory 1120, and executes the application according to the comparison result. The display module 1140 may display the information executed according to the logic of the application through the display panel 1141. The fingerprint sensor 1161-1 may be arranged such that the fingerprint sensor 1161-1 is capable of acquiring fingerprint information in the entire area of the display module 1140 (or the display panel 1141).

In another example, when the music streaming icon displayed in the display module 1140 is selected, the processor 1110 acquires a user input through the input sensor 1161-2 and activates the music streaming application stored in the memory 1120. In an example in which a music execution command is input in a music streaming application, the processor 1110 activates the audio output module 1163 in association with providing the user with audio information corresponding to the music execution command.

As provided herein, the operation of the electronic device 1000 has been briefly described. Further herein, the configuration of the electronic device 1000 will be described in detail. Some of the configurations of the electronic device 1000 described herein may be integrated and provided as one configuration, and one configuration may be provided by separating the configuration into two or more configurations.

The electronic device 1000 may communicate with an external electronic device 2000 through a network (for example, a short-range wireless communication network or a long-range wireless communication network). According to one embodiment, the electronic device 1000 may include a processor 1110, a memory 1120, an input module 1130, a display module 1140, a power module 1150, a built-in module 1160, and an external module 1170. According to one embodiment, the electronic device 1000 may omit at least one of the components described herein, or may have one or more other components added. According to one embodiment, some of the components described herein (for example, the sensor module 1161, the antenna module 1162, or the audio output module 1163) may be integrated into another component (for example, the display module 1140).

The processor 1110 may execute software to control at least one other component (for example, a hardware or software component) of the electronic device 1000 connected to the processor 1110, and may perform various data processing or operations. According to one embodiment, as at least a part of data processing or calculation, the processor 1110 may store commands or data received from other components (for example, the input module 1130, the sensor module 1161, or the communication module 1173) in a volatile memory 1121, process the commands or data stored in the volatile memory 1121, and store result data in a nonvolatile memory 1122.

The processor 1110 may include a main processor 1111 and an auxiliary processor 1112. The main processor 1111 may include one or more of a central processing unit (CPU) 1111-1, and an application processor AP. The main processor 1111 may further include one or more of a graphic processing unit (GPU) 1111-2, a communication processor (CP), and an image signal processor ISP. The main processor 1111 may further include a neural network processing unit (NPU) 1111-3. The neural network processing unit (NPU) 1111-3 is a processor specialized in processing an artificial intelligence model, and the artificial intelligence model may be generated through machine learning. The artificial intelligence model may include a plurality of artificial neural network layers. The artificial neural network may be one of a deep neural network (DNN), a convolutional neural network (CNN), a recurrent neural network (RNN), a restricted Boltzmann machine (RBM), a deep belief network (DBN), a bidirectional recurrent deep neural network (BRDNN), and deep Q-networks, or a combination of two or more of the described networks or machines, but is not limited to the examples provided herein. In addition to the hardware structure, the artificial intelligence model may additionally or alternatively include a software structure. At least two of the processing units and processors described herein may be implemented as one integrated configuration (for example, a single chip), or each may be implemented as an independent configuration (for example, a plurality of chips).

The auxiliary processor 1112 may include a controller 1112-1. The controller 1112-1 may include an interface conversion circuit and a timing control circuit. For example, the controller 1112-1 may include a timing controller 150 illustrated in FIG. 1. The controller 1112-1 receives an image signal from the main processor 1111, converts the data format of the image signal to match the interface specifications with the display module 1140, and outputs the image data. The controller 1112-1 may output various control signals associated with driving the display module 1140.

The auxiliary processor 1112 may further include a data conversion circuit 1112-2, a gamma correction circuit 1112-3, a rendering circuit 1112-4, and a touch control circuit (not illustrated). The data conversion circuit 1112-2 may receive image data from the controller 1112-1 and compensate for the image data such that the image is displayed at a desired brightness according to the characteristics of the electronic device 1000 or the user's settings, or convert the image data for reducing power consumption or compensating for after-images.

The gamma correction circuit 1112-3 may convert the image data, the gamma reference voltage, or the like such that the image displayed in the electronic device 1000 has the desired gamma characteristics. The rendering circuit 1112-4 may receive image data from the controller 1112-1 and render the image data by considering the pixel layout of the display panel 1141 applied to the electronic device 1000.

The touch control circuit may supply a touch signal to the input sensor 1161-2 and receive a sensing signal from the input sensor 1161-2 in response to the touch signal.

At least one of the data conversion circuit 1112-2, the gamma correction circuit 1112-3, the rendering circuit 1112-4, and the touch control circuit may be integrated into another component (for example, the main processor 1111 or the controller 1112-1). At least one of the data conversion circuit 1112-2, the gamma correction circuit 1112-3, and the rendering circuit 1112-4 may also be integrated into the source driver 1143 described herein.

The memory 1120 may store various pieces of data used by at least one component of the electronic device 1000 (for example, the processor 1110 or the sensor module 1161), and input data or output data for commands related thereto. In some aspects, various pieces of setting data corresponding to the user's settings may be stored in the memory 1120. The memory 1120 may include at least one of the volatile memory 1121 and the nonvolatile memory 1122.

The input module 1130 may receive a command or data to be used in a component of the electronic device 1000 (for example, the processor 1110, the sensor module 1161, or the audio output module 1163) from an external source of the electronic device 1000 (for example, a user or the external electronic device 2000).

The input module 1130 may include a first input module 1131 into which a command or data is input from a user, and a second input module 1132 into which a command or data is input from an external electronic device 2000. The first input module 1131 may include a microphone, a mouse, a keyboard, a key (for example, a button), or a pen (for example, a passive pen or an active pen). The second input module 1132 may support a designated protocol that may be connected to the external electronic device 2000 by wire or wirelessly. According to one embodiment, the second input module 1132 may include a high definition multimedia interface (HDMI), a universal serial bus (USB) interface, a secure digital (SD) card interface, or an audio interface. The second input module 1132 may include a connector that may be physically connected to the external electronic device 2000, for example, an HDMI connector, a USB connector, an SD card connector, or an audio connector (for example, a headphone connector).

The display module 1140 provides information to the user visually. The display module 1140 may include a display panel 1141, a gate driver 1142, and a source driver 1143. The display module 1140 may further include a window, a chassis, and a bracket for protecting the display panel 1141.

The display panel (or a display) 1141 may include a liquid crystal display panel, an organic light-emitting display panel, or an inorganic light-emitting display panel, and the type of the display panel 1141 is not particularly limited. The display panel 1141 may be a rigid type, or a flexible type that is rollable or foldable. The display module 1140 may further include a supporter, a bracket, or a heat dissipation member that supports the display panel 1141.

The display panel 1141 may receive image data from the auxiliary processor 1112 and display the image while controlling the amount of current supplied from the first driving voltage VDD to the second driving voltage VSS through the pixels PX in response to the image data. The display panel 1141 may correspond to the display unit 110 illustrated in FIG. 1. The display panel 1141 may include the first pixel PX1 and the second pixel PX2 illustrated in FIG. 1.

The gate driver 1142 may be mounted on the display panel 1141 as a driving chip. In some aspects, the gate driver 1142 may be integrated into the display panel 1141. For example, the gate driver 1142 may include an Amorphous Silicon Thin Film Transistor (TFT) Gate driver circuit (ASG), a Low-Temperature Polycrystalline Silicon (LTPS) TFT Gate driver circuit, or an Oxide Semiconductor TFT Gate driver circuit (OSG) embedded in the display panel 1141. The gate driver 1142 receives a control signal from the controller 1112-1 and outputs scan signals to the display panel 1141 in response to the control signal. The gate driver 1142 may include the gate driver 120 illustrated in FIG. 1.

The display module 1140 may further include an emission driver. The emission driver outputs an emission control signal to the display panel 1141 in response to a control signal received from the controller 1112-1. The emission driver may be formed separately from the gate driver 1142 or may be integrated into the gate driver 1142. The emission driver may include the emission driver 160 illustrated in FIG. 1.

The source driver 1143 receives a control signal from the controller 1112-1, converts image data into an analog voltage (for example, a data signal) in response to the control signal, and then outputs data signals to the display panel 1141. The source driver 1143 may include the data driver 130 illustrated in FIG. 1.

The source driver 1143 may be integrated into another component (for example, the controller 1112-1). The functions of the interface conversion circuit and the timing control circuit of the controller 1112-1 described herein may be integrated into the source driver 1143.

The display module 1140 may further include a voltage generation circuit 1144. The voltage generation circuit 1144 may output various voltages associated with driving the display panel 1141. For example, the voltage generation circuit 1144 may include the voltage generator 140 illustrated in FIG. 1.

In an embodiment, the source driver 1143 may convert data (for example, output data Dout) corresponding to red (R), green (G), and blue (B) included in the image data received from the processor 1110 into a red data signal (or data voltage), a green data signal, and a blue data signal, and provide the data to a plurality of pixel columns included in the display panel 1141 during one horizontal period.

The power module 1150 supplies power to the components of the electronic device 1000. The power module 1150 may include a battery that charges the power supply voltage. The battery may include a non-rechargeable primary battery, a rechargeable secondary battery, or a fuel cell. The power module 1150 may include a power management integrated circuit (PMIC). The PMIC supplies power optimized for each of the modules described herein and the modules described herein. The power module 1150 may include a wireless power transmission/reception member electrically connected to the battery. The wireless power transmission/reception member may include a plurality of coil-shaped antenna radiators.

The electronic device 1000 may further include a built-in module 1160 and an external module 1170. The built-in module 1160 may include a sensor module 1161, an antenna module 1162, and an audio output module 1163. The external module 1170 may include a camera module 1171, a light module 1172, and a communication module 1173.

The sensor module 1161 may detect an input by the user's body or an input by a pen among the first input modules 1131, and generate an electric signal or data value corresponding to the input. The sensor module 1161 may include at least one of a fingerprint sensor 1161-1, an input sensor 1161-2, and a digitizer 1161-3.

The fingerprint sensor 1161-1 may generate a data value corresponding to a user's fingerprint. The fingerprint sensor 1161-1 may include either an optical or electrostatic capacitance fingerprint sensor.

The input sensor 1161-2 may generate a data value corresponding to the coordinate information of an input by the user's body or an input by the pen. The input sensor 1161-2 generates the amount of change in electrostatic capacity due to an input as a data value. The input sensor 1161-2 may detect an input by a passive pen or transmit and receive data with an active pen.

The input sensor 1161-2 may also measure a biological signal such as, for example, blood pressure, moisture, or body fat. In an example in which a user touches a part of his/her body to a sensor layer or a sensing panel and does not move for a certain period of time, the input sensor 1161-2 may detect a biological signal based on an electric field change by the part of his/her body and output information desired by the user to the display module 1140.

The digitizer 1161-3 may generate a data value corresponding to the coordinate information of the input by a pen. The digitizer 1161-3 generates an electromagnetic change amount caused by the input as a data value. The digitizer 1161-3 may detect an input by a passive pen or transmit and receive data with an active pen.

At least one of the fingerprint sensor 1161-1, the input sensor 1161-2, and the digitizer 1161-3 may be implemented as a sensor layer formed on the display panel 1141 through a continuous process. At least one of the fingerprint sensor 1161-1, the input sensor 1161-2, and the digitizer 1161-3 may be disposed on an upper side of the display panel 1141, and any one of the fingerprint sensor 1161-1, the input sensor 1161-2, and the digitizer 1161-3, for example, the digitizer 1161-3, may be disposed on a lower side of the display panel 1141.

At least two of the fingerprint sensor 1161-1, the input sensor 1161-2, and the digitizer 1161-3 may be formed to be integrated into one sensing panel through the same process. In an example in which integrated into one sensing panel, the sensing panel may be arranged between the display panel 1141 and a window arranged on the upper side of the display panel 1141. According to one embodiment, the sensing panel may be arranged on the window, and the position of the sensing panel is not particularly limited.

At least one of the fingerprint sensor 1161-1, the input sensor 1161-2, and the digitizer 1161-3 may be built into the display panel 1141. That is, at least one of the fingerprint sensor 1161-1, the input sensor 1161-2, and the digitizer 1161-3 may be formed simultaneously through a process of forming elements (for example, light-emitting elements, transistors, or the like) included in the display panel 1141.

In some aspects, the sensor module 1161 may generate an electric signal or data value corresponding to an internal state or an external state of the electronic device 1000. The sensor module 1161 may further include, for example, a gesture sensor, a gyro sensor, a pressure sensor, a magnetic sensor, an acceleration sensor, a grip sensor, a proximity sensor, a color sensor, an IR (infrared) sensor, a biometric sensor, a temperature sensor, or a humidity sensor.

The antenna module 1162 may include one or more antennas for transmitting or receiving signals or power to or from the outside. According to one embodiment, the communication module 1173 may transmit or receive signals to or from an external electronic device through an antenna suitable for a communication method. The antenna pattern of the antenna module 1162 may be integrated into one component of the display module 1140 (for example, the display panel 1141) or the input sensor 1161-2.

The audio output module 1163 is a device for outputting audio signals to the outside of the electronic device 1000 and may include, for example, a speaker used for general purposes such as, for example, multimedia playback or recording playback and a receiver used exclusively for phone reception. According to one embodiment, the receiver may be formed integrally with or separately from the speaker. The audio output pattern of the audio output module 1163 may be integrated into the display module 1140.

The camera module 1171 may capture still images and moving images. According to one embodiment, the camera module 1171 may include one or more lenses, image sensors, or image signal processors. The camera module 1171 may further include an infrared camera capable of measuring the presence or absence of a user, the user's location, the user's line of sight, and the like.

The light module 1172 may provide light. The light module 1172 may include a light-emitting diode or a xenon lamp. The light module 1172 may operate in conjunction with the camera module 1171 or may operate independently.

The communication module 1173 may support the establishment of a wired or wireless communication channel between the electronic device 1000 and the external electronic device 2000 and the performance of communication through the established communication channel. The communication module 1173 may include one or both of a wireless communication module such as, for example, a cellular communication module, a short-range wireless communication module, or a global navigation satellite system (GNSS) communication module, and a wired communication module such as, for example, a local area network (LAN) communication module, or a power line communication module. The communication module 1173 may communicate with an external electronic device 2000 via a short-range communication network such as, for example, Bluetooth, wireless fidelity (WiFi) direct, or IrDA (infrared data association), or a long-range communication network such as, for example, a cellular network, the Internet, or a computer network (for example, a local area network (LAN)

or wide area network (WAN)). The various types of communication modules 1173 described herein may be implemented as one chip, or each may be implemented as a separate chip.

The input module 1130, the sensor module 1161, the camera module 1171, and the like may be used to control the operation of the display module 1140 in conjunction with the processor 1110.

The processor 1110 outputs a command or data to the display module 1140, the audio output module 1163, the camera module 1171, or the light module 1172 based on the input data received from the input module 1130. For example, the processor 1110 may generate image data in response to input data received through a mouse or an active pen and output the image data to the display module 1140 or generate command data in response to the input data and output the image data to the camera module 1171 or the light module 1172. In an example in which no input data is received from the input module 1130 for a certain period of time, the processor 1110 may switch the operation mode of the electronic device 1000 to a low power mode or a sleep mode to reduce the power consumed by the electronic device 1000.

The processor 1110 outputs a command or data to the display module 1140, the audio output module 1163, the camera module 1171, or the light module 1172 based on the sensing data received from the sensor module 1161. For example, the processor 1110 may compare authentication data authorized by the fingerprint sensor 1161-1 with authentication data stored in the memory 1120, and then execute an application based on the comparison result. The processor 1110 may execute a command or output corresponding image data to the display module 1140 based on sensing data detected by the input sensor 1161-2 or the digitizer 1161-3. If the sensor module 1161 includes a temperature sensor, the processor 1110 may receive temperature data on the temperature measured from the sensor module 1161 and further perform brightness correction and the like on the image data based on the temperature data.

The processor 1110 may receive measurement data on the presence or absence of a user, the user's location, the user's line of sight, and the like from the camera module 1171. The processor 1110 may further perform brightness correction and the like on the image data based on the measurement data. For example, the processor 1110 that determines the presence or absence of a user through input from the camera module 1171 may output the image data whose brightness has been corrected through the data conversion circuit 1112-2 or the gamma correction circuit 1112-3 to the display module 1140.

Some of the components described herein may be connected to each other through a communication method between peripheral devices, such as, for example, a bus, GPIO (general purpose input/output), SPI (serial peripheral interface), MIPI (mobile industry processor interface), or UPI (ultra path interconnect) link, and exchange signals (for example, commands or data) with each other. The processor 1110 may communicate with the display module 1140 through a mutually agreed interface, and may use, for example, any one of the communication methods described herein, and is not limited to the communication methods described herein.

Although the aspects of the present disclosure has been described in example embodiments, those skilled in the art may understand that the example embodiments described herein may be variously modified and changed within the scope and spirit of the example aspects described in the claims.

What is claimed is:

1. A display device comprising:

pixels connected to scan lines, emission control lines, control lines, and data lines, wherein:

the pixels comprise a first pixel and a second pixel positioned adjacent to each other in an i-th control line and connected to a j-th data line, wherein i is a natural number of 1 or more and j is a natural number of 1 or more, the first pixel comprises a first selection unit, and the first selection unit is configured to transmit a data signal input from the j-th data line to a driving transistor of the first pixel during a first period in response to a control signal supplied to the i-th control line, and the second pixel comprises a second selection unit, and the second selection unit is configured to transmit the data signal input from the j-th data line to a driving transistor of the second pixel during a second period different from the first period in response to the control signal supplied to the i-th control line.

2. The display device of claim 1, further comprising:

a data driver configured to supply data signals to the data lines, wherein the data driver is configured to:

supply a first data signal corresponding to the first pixel to the j-th data line during the first period, and supply a second data signal corresponding to the second pixel to the j-th data line during the second period.

3. The display device of claim 1, wherein the first selection unit is configured to electrically connect a gate electrode of the driving transistor of the first pixel with the j-th data line during the first period.

4. The display device of claim 1, wherein the second selection unit is configured to electrically connect a gate electrode of the driving transistor of the second pixel with the j-th data line during the second period.

5. The display device of claim 1, wherein the i-th control line is at least one of the scan lines and the emission control lines.

6. The display device of claim 1, wherein:

each of the scan lines comprises a first sub-scan line, a second sub-scan line, and a third sub-scan line, and each of the first pixel and the second pixel further comprises:

a first transistor corresponding to the driving transistor and comprising a first electrode connected to a first power line via a first node, a second electrode connected to a second node, and a gate electrode connected to a third node;

a second transistor connected between the second node and the j-th data line and comprising a gate electrode connected to an i-th first sub-scan line;

a third transistor connected between the first node and the third node and comprising a gate electrode connected to the i-th first sub-scan line; and a light-emitting element comprising an anode electrode connected to the second node and a cathode electrode connected to a second power line.

7. The display device of claim 6, wherein:

the first selection unit comprised in the first pixel comprises a P-type first selection transistor connected between the third transistor comprised in the first pixel and the third node comprised in the first pixel, wherein the P-type first selection transistor comprises a gate electrode connected to the i-th control line, and the second selection unit comprised in the second pixel comprises an N-type second selection transistor connected between the third transistor comprised in the second pixel and the first node comprised in the second pixel, wherein the N-type second selection transistor comprises a gate electrode connected to the i-th control line.

8. The display device of claim 7, wherein:

the P-type first selection transistor is configured to turn on during the first period in response to the control signal, and the N-type second selection transistor is configured to turn on during the second period in response to the control signal.

9. The display device of claim 7, wherein each of the first pixel and the second pixel further comprises:

a fourth transistor connected between the third node and a third power line and comprising a gate electrode connected to an i-th second sub-scan line;

a fifth transistor connected between the anode electrode of the light-emitting element and a fourth power line and comprising a gate electrode connected to an i-th third sub-scan line;

a sixth transistor connected between the first power line and the first node and comprising a gate electrode connected to an i-th emission control line;

a seventh transistor connected between the second node and the anode electrode of the light-emitting element and comprising a gate electrode connected to the i-th emission control line; and a storage capacitor connected between the third node and the anode electrode of the light-emitting element.

10. The display device of claim 9, wherein the i-th control line is an emission control line located in a next horizontal line.

11. The display device of claim 10, wherein the i-th control line is an (i+2)-th emission control line.

12. The display device of claim 11, further comprising:

a gate driver configured to drive the scan lines; and an emission driver configured to drive the emission control lines, wherein:

the gate driver is configured to:

supply a second scan signal of a gate-on voltage to the i-th second sub-scan line, and then supply a first scan signal of a gate-on voltage to the i-th first sub-scan line and supply a third scan signal of a gate-on voltage to the i-th third sub-scan line such that the first scan signal and the third scan signal overlap each other;

the emission driver is configured to supply an emission control signal of a logic high level to the i-th emission control line so as to overlap with the first scan signal, the second scan signal, and the third scan signal, and the emission driver is configured to supply the emission control signal of a logic high level to the (i+2)-th emission control line such that the emission control signal overlaps with the first scan signal for a partial period.

13. The display device of claim 6, wherein:

the first selection unit comprised in the first pixel comprises a first selection transistor connected between the third transistor comprised in the first pixel and the third node comprised in the first pixel, wherein the first selection transistor comprises a gate electrode connected to a first sub-control line among the i-th control lines, and the second selection unit comprised in the second pixel comprises a second selection transistor connected between the third transistor comprised in the second pixel and the first node comprised in the second pixel, wherein the second selection transistor comprises a gate electrode connected to a second sub-control line among the i-th control lines.

14. The display device of claim 13, wherein:

the control signal comprises a first control signal supplied to the first sub-control line and a second control signal supplied to the second sub-control line, the first selection transistor is configured to turn on during the first period in response to the first control signal, and the second selection transistor is configured to turn on during the second period in response to the second control signal.

15. The display device of claim 13, wherein each of the first pixel and the second pixel further comprises:

a fourth transistor connected between the third node and a third power line and comprising a gate electrode connected to an i-th second sub-scan line;

a fifth transistor connected between the anode electrode of the light-emitting element and a fourth power line and comprising a gate electrode connected to an i-th third sub-scan line;

a sixth transistor connected between the first power line and the first node and comprising a gate electrode connected to an i-th emission control line;

a seventh transistor connected between the second node and the anode electrode of the light-emitting element and comprising a gate electrode connected to the i-th emission control line; and a storage capacitor connected between the third node and the anode electrode of the light-emitting element.

16. The display device of claim 15, wherein:

the first sub-control line is an (i+1)-th second sub-scan line, and the second sub-control line is an (i+2)-th second sub-scan line.

17. The display device of claim 16, further comprising:

a gate driver configured to drive the scan lines; and an emission driver configured to drive the emission control lines, wherein:

the gate driver is configured to sequentially supply a second scan signal of a gate-on voltage to the i-th second sub-scan line, the (i+1)-th second sub-scan line, and the (i+2)-th second sub-scan line such that the second scan signal at the i-th second sub-scan line, the second scan signal at the (i+1)-th second sub-scan line, and the second scan signal at the (i+2)-th second sub-scan line do not overlap each other, the gate driver is configured to supply a first scan signal of a gate-on voltage to the i-th first sub-scan line and a third scan signal of a gate-on voltage to the i-th third sub-scan line such that:

the first scan signal at the i-th first sub-scan line overlaps with the second scan signal at the (i+1)-th second sub-scan line and the second scan signal at the (i+2)-th second sub-scan line for a partial period; and the third scan signal at i-th third sub-scan line overlaps with the second scan signal at the (i+1)-th second sub-scan line and the second scan signal at the (i+2)-th second sub-scan line for a partial period, the emission driver is configured to supply an emission control signal of a gate-off voltage to the i-th emission control line such that the emission control signal overlaps with the second scan signal at the i-th second sub-scan line, the second scan signal at the (i+1)-th second sub-scan line, and the second scan signal at the (i+2)-th second sub-scan line, a period during which the second scan signal at the (i+1)-th second sub-scan line and the first scan signal at the i-th first sub-scan line overlap is the first period, and a period during which the second scan signal at the (i+2)-th second sub-scan line and the first scan signal at the i-th first sub-scan line overlap is the second period.

18. The display device of claim 15, wherein:

the first sub-control line is the i-th third sub-scan line, and the second sub-control line is an (i+1)-th third sub-scan line.

19. The display device of claim 18, further comprising:

a gate driver configured to drive the scan lines; and an emission driver configured to drive the emission control lines, wherein:

the gate driver is configured to:

supply a second scan signal of a gate-on voltage to the i-th second sub-scan line, and then supply a first scan signal of a gate-on voltage to the i-th first sub-scan line, the gate driver is configured to supply a third scan signal of a gate-on voltage to the i-th third sub-scan line such that the third scan signal overlaps at least partially with the second scan signal and the first scan signal, the gate driver is configured to supply the third scan signal of the gate-on voltage to the (i+1)-th third sub-scan line such that the third scan signal overlaps at least partially with the first scan signal, and the emission driver is configured to supply an emission control signal of a gate-off voltage such that the emission control signal overlaps with the second scan signal at the i-th second sub-scan line and the third scan signal at the (i+1)-th third sub-scan line.

20. A method of driving a display device, comprising:

electrically connecting a driving transistor of a first pixel and a data line during a first period in response to a first control signal supplied to a first selection unit comprised in the first pixel; and electrically connecting a driving transistor of a second pixel and the data line during a second period different from the first period in response to a second control signal supplied to a second selection unit comprised in the second pixel.

21. The method of driving the display device of claim 20, further comprising:

supplying a first data signal corresponding to the first pixel to the data line during the first period; and supplying a second data signal corresponding to the second pixel to the data line during the second period.

22. The method of driving the display device of claim 20, wherein:

each of the first pixel and the second pixel is connected to a plurality of sub-scan lines and an emission control line, and each of the first control signal and the second control signal is one of scan signals supplied to the plurality of sub-scan lines or one of emission control signals supplied to the emission control line.

23. An electronic device comprising:

a display device comprising:

pixels connected to scan lines, emission control lines, control lines, and data lines, wherein:

the pixels comprise a first pixel and a second pixel positioned adjacent to each other in an i-th control line and connected to a j-th data line, wherein i is a natural number of 1 or more and j is a natural number of 1 or more, the first pixel comprises a first selection unit, and the first selection unit is configured to transmit a data signal input from the j-th data line to a driving transistor of the first pixel during a first period in response to a control signal supplied to the i-th control line, and the second pixel comprises a second selection unit, and the second selection unit is configured to transmit the data signal input from the j-th data line to a driving transistor of the second pixel during a second period different from the first period in response to the control signal supplied to the i-th control line.

* * * * *